(12) United States Patent
Chelko et al.

(10) Patent No.: US 11,481,808 B2
(45) Date of Patent: Oct. 25, 2022

(54) SYSTEM AND APPARATUS FOR IDENTIFIER MATCHING AND MANAGEMENT

(71) Applicant: Cardlytics, Inc., Atlanta, GA (US)

(72) Inventors: Jeffrey Chelko, Marietta, GA (US); Julio Farach, Atlanta, GA (US); Scott Grimes, Atlanta, GA (US); Joseph Schab, Atlanta, GA (US); Jacob Warhaftig, Atlanta, GA (US)

(73) Assignee: Cardlytics, Inc., Atlanta, GA (US)

( * ) Notice: Subject to any disclaimer, the term of this patent is extended or adjusted under 35 U.S.C. 154(b) by 627 days.

(21) Appl. No.: 14/617,112

(22) Filed: Feb. 9, 2015

(65) Prior Publication Data

US 2015/0332338 A1    Nov. 19, 2015

Related U.S. Application Data

(60) Provisional application No. 61/994,656, filed on May 16, 2014.

(51) Int. Cl.
*G06Q 30/02* (2012.01)
*H04L 9/40* (2022.01)
(Continued)

(52) U.S. Cl.
CPC ......... *G06Q 30/0269* (2013.01); *G06F 21/35* (2013.01); *G06F 21/6245* (2013.01);
(Continued)

(58) Field of Classification Search
CPC ............... G06Q 30/02; G06Q 30/0267; G06Q 30/0269; G06Q 2220/10; G06F 21/35;
(Continued)

(56) References Cited

U.S. PATENT DOCUMENTS 4,723,212 A    2/1988  Mindrum et al.
4,910,672 A    3/1990  Off et al.
(Continued)

FOREIGN PATENT DOCUMENTS

EP    1259947 B1    10/2004
EP    1257992 B1    2/2007
(Continued)

OTHER PUBLICATIONS

International Search Report and Written Opinion dated Jun. 8, 2015 in related PCT patent application No. PCT/US15/15008.
(Continued)

*Primary Examiner* — Mohammad A. Nilforoush
*Assistant Examiner* — Wodajo Getachew
(74) *Attorney, Agent, or Firm* — Morris, Manning & Martin, LLP; Daniel E. Sineway, Esq.; Adam J. Thompson, Esq.

(57) ABSTRACT

Systems, methods, and apparatuses for identifier matching and management are described herein. In various embodiments, the system includes a distributed architecture for receiving and matching public and secure identifiers associated with a particular consumer. In particular embodiments, the system uses the matched public and secure identifiers to transmit one or more messages to the particular consumer.

42 Claims, 11 Drawing Sheets

EXEMPLARY COOKIE/ID WRITING AND SYNCING PROCESS

(51) Int. Cl.
   *G06F 21/35* (2013.01)
   *G06F 21/62* (2013.01)
(52) U.S. Cl.
   CPC ......... *G06Q 30/02* (2013.01); *G06Q 30/0267* (2013.01); *H04L 63/029* (2013.01); *H04L 63/105* (2013.01); *G06Q 2220/10* (2013.01)
(58) Field of Classification Search
   CPC .. G06F 21/6245; H04L 63/029; H04L 63/105
   USPC .......................................................... 705/51
   See application file for complete search history.

(56) References Cited

U.S. PATENT DOCUMENTS

| | | |
|---|---|---|
| 5,173,851 A | 12/1992 | Off et al. |
| 5,220,501 A | 6/1993 | Lawlor et al. |
| 5,612,868 A | 3/1997 | Off et al. |
| 5,689,100 A | 11/1997 | Carrithers et al. |
| 5,832,457 A | 11/1998 | O'Brien et al. |
| 5,870,724 A | 2/1999 | Lawlor et al. |
| 5,884,035 A | 3/1999 | Butman et al. |
| 5,892,827 A | 4/1999 | Beach et al. |
| 5,915,007 A | 6/1999 | Klapka |
| 5,918,014 A | 6/1999 | Robinson |
| 5,926,795 A | 7/1999 | Williams |
| 6,026,370 A | 2/2000 | Jermyn |
| 6,067,524 A | 5/2000 | Byerly et al. |
| 6,202,054 B1 | 3/2001 | Lawlor et al. |
| 6,216,129 B1 | 4/2001 | Eldering |
| 6,240,394 B1 | 5/2001 | Uecker et al. |
| 6,278,979 B1 | 8/2001 | Williams |
| 6,282,516 B1 | 8/2001 | Giuliani |
| 6,304,849 B1 | 10/2001 | Uecker et al. |
| 6,307,958 B1 | 10/2001 | Deaton et al. |
| 6,321,210 B1 | 11/2001 | O'Brien et al. |
| 6,327,574 B1 | 12/2001 | Kramer et al. |
| 6,332,126 B1 | 12/2001 | Peirce et al. |
| 6,334,108 B1 | 12/2001 | Deaton et al. |
| 6,351,735 B1 | 2/2002 | Deaton et al. |
| 6,377,935 B1 | 4/2002 | Deaton et al. |
| 6,424,949 B1 | 7/2002 | Deaton et al. |
| 6,424,951 B1 | 7/2002 | Shurling et al. |
| 6,434,747 B1 | 8/2002 | Khoo et al. |
| 6,484,146 B2 | 11/2002 | Day et al. |
| 6,560,578 B2 | 5/2003 | Eldering |
| 6,604,085 B1 | 8/2003 | Kolls |
| 6,795,809 B2 | 9/2004 | O'Brien et al. |
| 6,885,994 B1 | 4/2005 | Scroggie et al. |
| 7,024,374 B1 | 4/2006 | Day et al. |
| 7,058,591 B2 | 6/2006 | Giuliani et al. |
| 7,076,458 B2 | 7/2006 | Lawlor et al. |
| 7,136,875 B2 | 11/2006 | Anderson et al. |
| 7,228,285 B2 | 6/2007 | Hull et al. |
| 7,292,999 B2 | 11/2007 | Hobson et al. |
| 7,309,001 B2 | 12/2007 | Banfield et al. |
| 7,310,609 B2 | 12/2007 | Middleton, III et al. |
| 7,386,485 B1 | 6/2008 | Mussman et al. |
| 7,392,224 B1 | 6/2008 | Bauer et al. |
| 7,415,426 B2 | 8/2008 | Williams et al. |
| 7,430,521 B2 | 9/2008 | Walker et al. |
| 7,580,856 B1 | 8/2009 | Pliha et al. |
| 7,693,790 B2 | 4/2010 | Lawlor et al. |
| 8,160,921 B2 | 4/2012 | Gebhardt et al. |
| 8,302,169 B1* | 10/2012 | Presotto ............... G06F 21/602 726/19 |
| 8,479,978 B1 | 7/2013 | Miller et al. |
| 8,489,456 B2 | 7/2013 | Burgess et al. |
| 8,527,421 B2 | 9/2013 | Gailey et al. |
| 8,589,225 B2 | 11/2013 | Cohagen et al. |
| 8,590,022 B2 | 11/2013 | Faryna et al. |
| 8,606,865 B2 | 12/2013 | Layson, Jr. |
| 8,688,579 B1 | 4/2014 | Ethington et al. |
| 2002/0023955 A1 | 2/2002 | Frank et al. |
| 2002/0069115 A1 | 6/2002 | Fitzpatrick |
| 2002/0078147 A1 | 6/2002 | Bouthers et al. |
| 2002/0091566 A1 | 7/2002 | Siegel |
| 2002/0123928 A1 | 9/2002 | Eldering et al. |
| 2002/0147639 A1 | 10/2002 | Williams et al. |
| 2003/0033199 A1 | 2/2003 | Coleman |
| 2003/0040959 A1 | 2/2003 | Fei et al. |
| 2003/0055723 A1 | 3/2003 | English |
| 2003/0069808 A1 | 4/2003 | Cardno |
| 2003/0088466 A1 | 5/2003 | Fitzpatrick |
| 2003/0101454 A1 | 5/2003 | Ozer et al. |
| 2003/0158844 A1 | 8/2003 | Kramer et al. |
| 2004/0111491 A1 | 6/2004 | Raja et al. |
| 2004/0122736 A1 | 6/2004 | Strock et al. |
| 2004/0159700 A1 | 8/2004 | Khan et al. |
| 2006/0122921 A1 | 6/2006 | Comerford et al. |
| 2006/0212350 A1 | 9/2006 | Ellis et al. |
| 2007/0000996 A1 | 1/2007 | Lambert et al. |
| 2007/0027754 A1 | 2/2007 | Collins et al. |
| 2007/0027758 A1 | 2/2007 | Collins et al. |
| 2007/0219865 A1 | 9/2007 | Leining |
| 2007/0265948 A1 | 11/2007 | Maiorino et al. |
| 2008/0052153 A1 | 2/2008 | Oook |
| 2008/0086365 A1 | 4/2008 | Zollino et al. |
| 2008/0091535 A1 | 4/2008 | Heiser et al. |
| 2008/0103887 A1 | 5/2008 | Oldham et al. |
| 2008/0205655 A1 | 8/2008 | Wilkins et al. |
| 2008/0021986 A1 | 9/2008 | Soicher et al. |
| 2009/0006212 A1 | 1/2009 | Krajicek et al. |
| 2009/0037264 A1 | 2/2009 | Del Favero et al. |
| 2009/0048978 A1* | 2/2009 | Ginter ..................... G07F 9/026 705/51 |
| 2009/0099931 A1 | 4/2009 | Aaltonen et al. |
| 2009/0106368 A1 | 4/2009 | Padveen et al. |
| 2009/0112757 A1 | 4/2009 | Hammad et al. |
| 2009/0119769 A1 | 5/2009 | Ross et al. |
| 2009/0132415 A1 | 5/2009 | Davis et al. |
| 2009/0199094 A1 | 8/2009 | Jurgens et al. |
| 2009/0234708 A1 | 9/2009 | Heiser, II et al. |
| 2009/0287562 A1 | 11/2009 | Bosch et al. |
| 2009/0300723 A1* | 12/2009 | Nemoy ................. H04L 63/102 726/4 |
| 2009/0327151 A1 | 12/2009 | Carlson et al. |
| 2010/0010887 A1 | 1/2010 | Karlin et al. |
| 2010/0106596 A1* | 4/2010 | Grimes .............. G06Q 30/0261 705/14.51 |
| 2010/0332260 A1 | 12/2010 | Kassas |
| 2011/0035594 A1 | 2/2011 | Fox |
| 2011/0046621 A1 | 2/2011 | Poshajsky |
| 2011/0047023 A1 | 2/2011 | Leiblang et al. |
| 2011/0082708 A1 | 4/2011 | Pourfallah |
| 2011/0082731 A1 | 4/2011 | Kepecs |
| 2011/0137717 A1 | 6/2011 | Reuthe et al. |
| 2011/0161150 A1 | 6/2011 | Steffens et al. |
| 2011/0238469 A1 | 9/2011 | Gershman et al. |
| 2011/0288918 A1 | 11/2011 | Cervenka et al. |
| 2012/0047003 A1 | 2/2012 | Hammad et al. |
| 2012/0101881 A1 | 4/2012 | Taylor et al. |
| 2012/0150611 A1 | 6/2012 | Isaacson et al. |
| 2012/0150641 A1* | 6/2012 | Dobbs .................... G06Q 30/02 705/14.53 |
| 2012/0150746 A1 | 6/2012 | Graham |
| 2012/0191525 A1 | 7/2012 | Singh et al. |
| 2012/0226530 A1 | 9/2012 | Gebb et al. |
| 2012/0253852 A1 | 10/2012 | Pourfallah et al. |
| 2012/0271697 A1 | 10/2012 | Gilman et al. |
| 2012/0271705 A1 | 10/2012 | Postrel |
| 2012/0331073 A1 | 12/2012 | Williams |
| 2013/0046621 A1 | 2/2013 | Asseoff et al. |
| 2013/0060631 A1 | 3/2013 | Corson et al. |
| 2013/0124315 A1* | 5/2013 | Doughty ............ G06Q 30/0261 705/14.53 |
| 2013/0155118 A1 | 6/2013 | Robinson et al. |
| 2013/0191213 A1 | 7/2013 | Beck et al. |
| 2013/0218657 A1 | 8/2013 | Salmon et al. |
| 2013/0218660 A1 | 8/2013 | Fargo et al. |
| 2013/0253967 A1 | 9/2013 | Single |
| 2013/0268342 A1 | 10/2013 | Tune et al. |
| 2013/0325582 A1 | 12/2013 | Drozd et al. |
| 2013/0332258 A1 | 12/2013 | Shiffert et al. |

(56) References Cited

U.S. PATENT DOCUMENTS

| | | |
|---|---|---|
| 2014/0006127 A1 | 1/2014 | Decook et al. |
| 2014/0058818 A1 | 2/2014 | Drozd et al. |
| 2014/0067571 A1 | 3/2014 | Fricke et al. |
| 2014/0074569 A1 | 3/2014 | Francis et al. |
| 2014/0081729 A1 | 3/2014 | Ocher |
| 2014/0108260 A1 | 4/2014 | Poole et al. |
| 2014/0129443 A1 | 5/2014 | Whitler |
| 2014/0164084 A1 | 6/2014 | Battles et al. |
| 2014/0200997 A1 | 7/2014 | Anderson et al. |
| 2014/0278970 A1 | 9/2014 | Calman et al. |
| 2014/0279420 A1 | 9/2014 | Okerlund et al. |
| 2015/0006265 A1 | 1/2015 | White et al. |
| 2015/0088607 A1 | 3/2015 | Georgoff et al. |
| 2015/0170112 A1 | 6/2015 | Decastro |
| 2015/0178693 A1 | 6/2015 | Solis |
| 2015/0187149 A1 | 7/2015 | Frank et al. |
| 2016/0012465 A1 | 1/2016 | Sharp |
| 2016/0034877 A1 | 2/2016 | Poole et al. |
| 2016/0104187 A1 | 4/2016 | Tietzen et al. |
| 2016/0150078 A1 | 5/2016 | Joshi et al. |
| 2016/0232556 A1 | 8/2016 | Postrel |
| 2016/0275558 A1 | 9/2016 | Tiku et al. |
| 2017/0046638 A1 | 2/2017 | Chan et al. |
| 2017/0076306 A1 | 3/2017 | Snider et al. |
| 2017/0094042 A1 | 3/2017 | Dagit, III |
| 2017/0140408 A1 | 5/2017 | Wuehler |
| 2018/0247330 A1 | 8/2018 | Duerr |
| 2018/0285920 A1 | 10/2018 | Loomis |
| 2018/0365733 A1 | 12/2018 | Christensen et al. |
| 2020/0250694 A1 | 8/2020 | Mock et al. |

FOREIGN PATENT DOCUMENTS

| | | |
|---|---|---|
| KR | 20130086738 A | 8/2013 |
| KR | 20150108458 A | 9/2015 |
| TW | 201511513 A | 3/2015 |
| WO | 1999050775 | 10/1999 |
| WO | 2001022374 | 3/2001 |
| WO | 2010016778 | 2/2010 |
| WO | 2015175033 A1 | 11/2015 |

OTHER PUBLICATIONS

Fitzgerald, U.S. Bank Launches Merchant-Funded Rewards Program witt1 FreeMonee, http://www.freemonee.com/wp-contentluploadsiPaymentsSource_4_•12_2012.pdf, Apr. 12, 2012, 2 pgs.

Dowling, et al., Do Customer Loyalty Programs Really Work?, http:liwww.royalloyalties.com/case_study.pdf, 1997, pp. 1-24 (28 pgs. total), Centre for Corporate Change—Australian Graduate School of Management, Australlia.

Wibowo, et. al., Loyalty Program Scheme for Anonymous Payment Systems, http://ittf.vlsm.org/bebas/v01/OnnoWPurbo/contrib/aplikasi/e-commerce/loyalty-program-scheme-for-anonymous-payment-systems-1999.pdf, 2000, pp. 1-2, National University of Singapore, Singapore.

International Search Report and Written Opinion for international patent application No. PCT/US15/15008 dated Jun. 8, 2015.

International Search Report and Written Opinion dated Mar. 17, 2020 for international patent application No. PCT/US19/69104.

Downing et al., "Dictionary of Computer and Internet Terms," Barron's Business Guides, Tenth Edition, Revised edition (2008), 561 pages.

Wiley Encyclopedia of Computer Science and Engineering, Published Nov. 2008, 2365 pages.

* cited by examiner

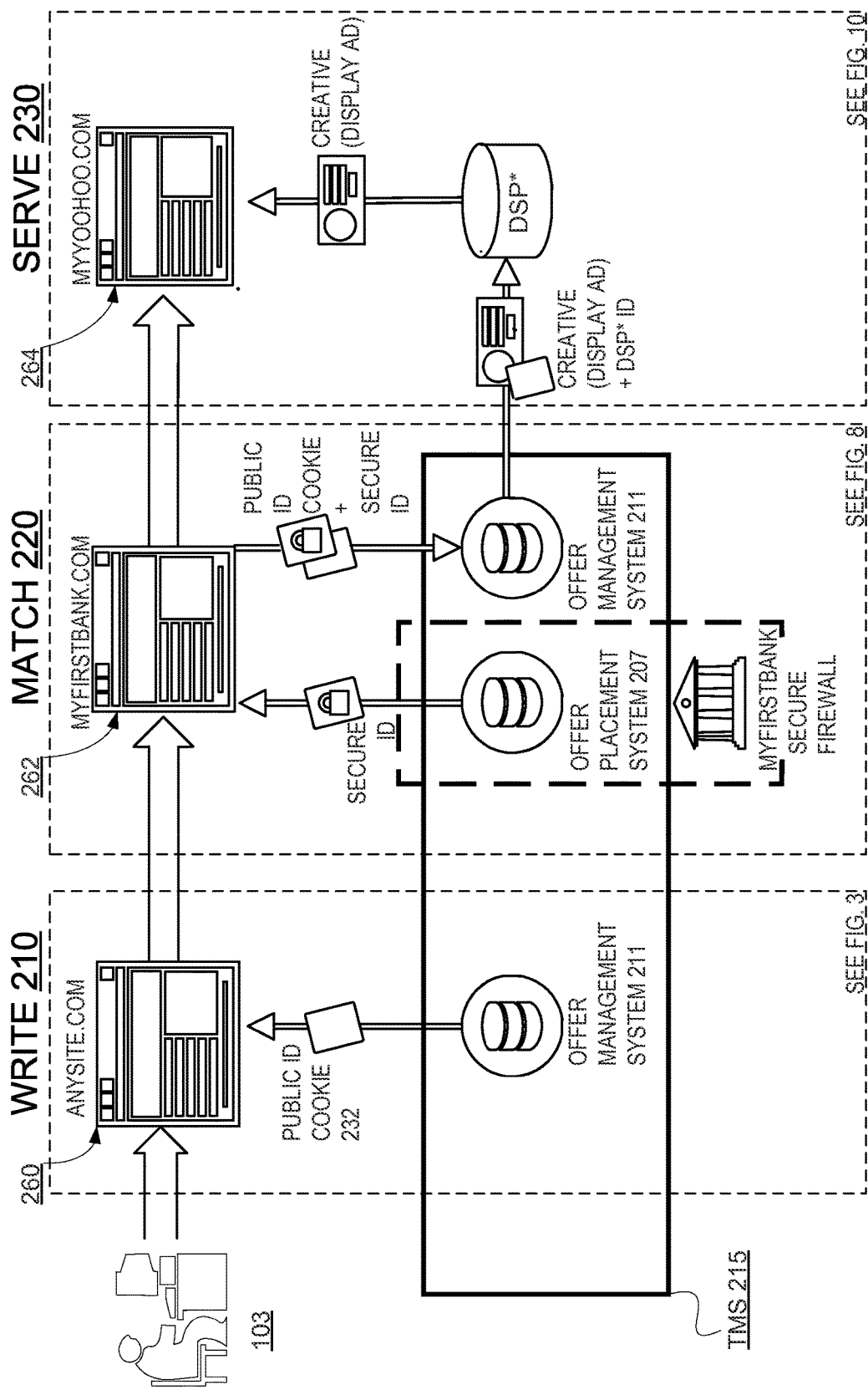
FIG. 2 EXEMPLARY AD DELIVERY PROCESS

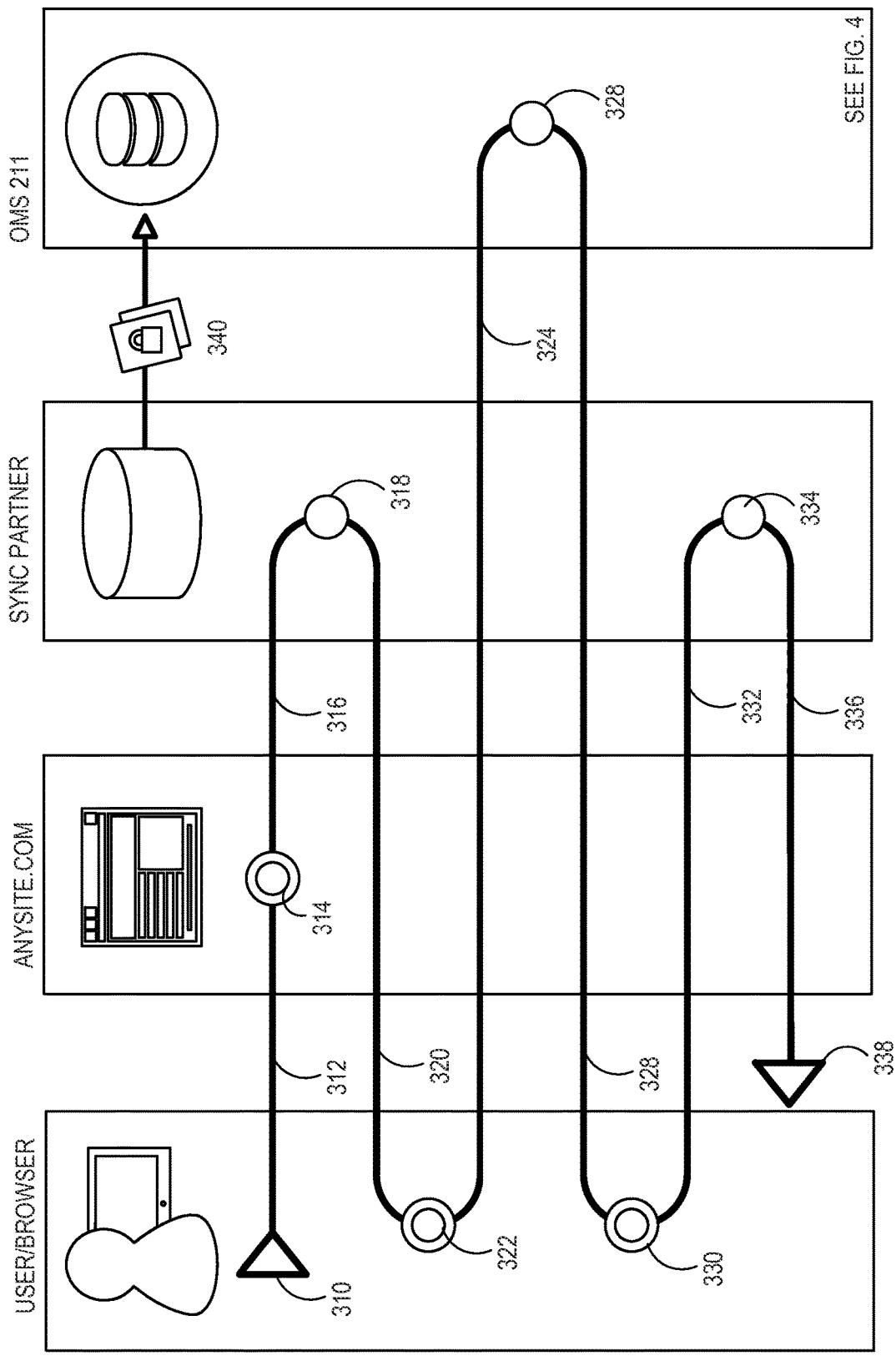
FIG. 3 EXEMPLARY COOKIE/ID WRITING AND SYNCING PROCESS

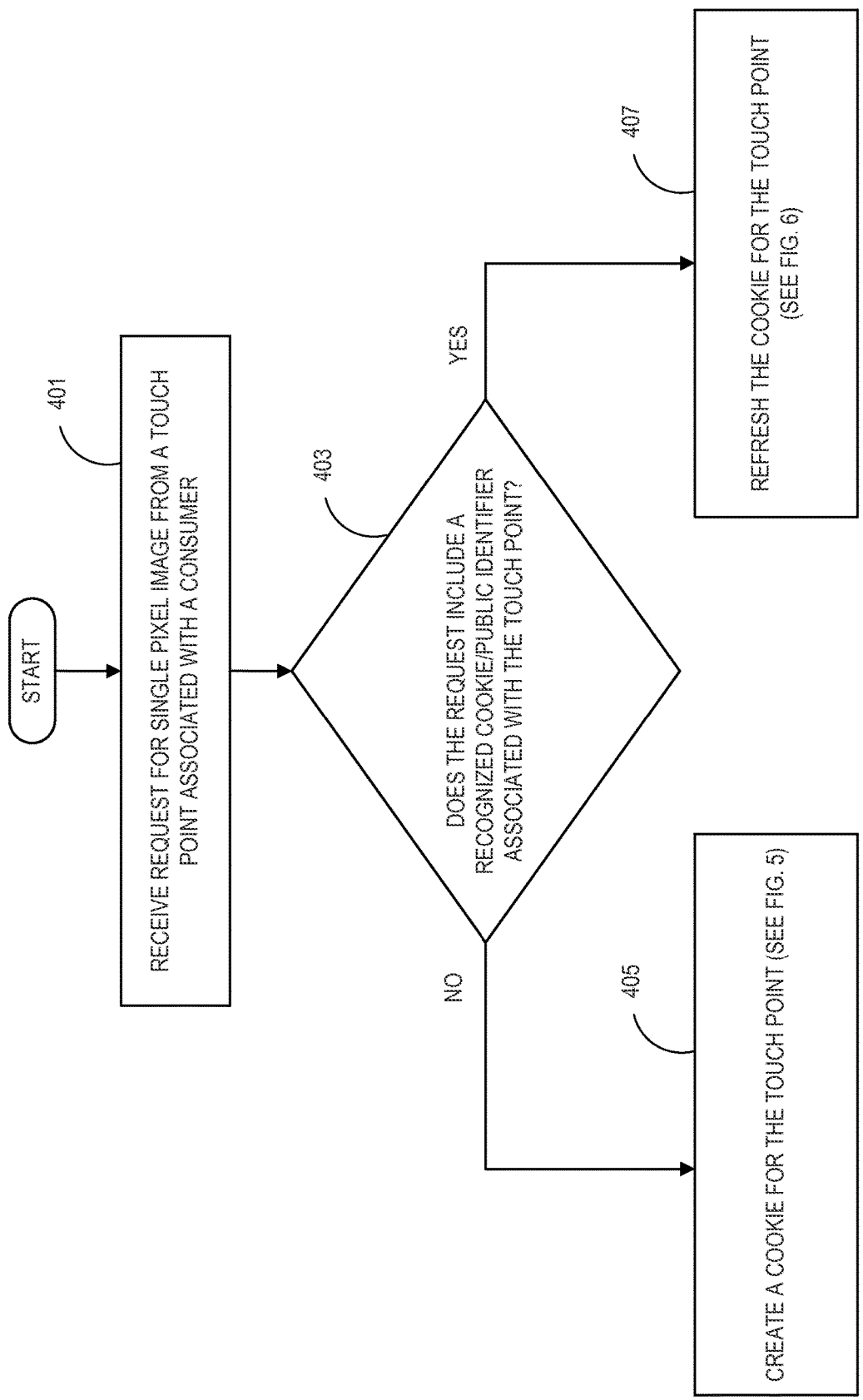
FIG. 4   EXEMPLARY COOKIE CREATION PROCESS

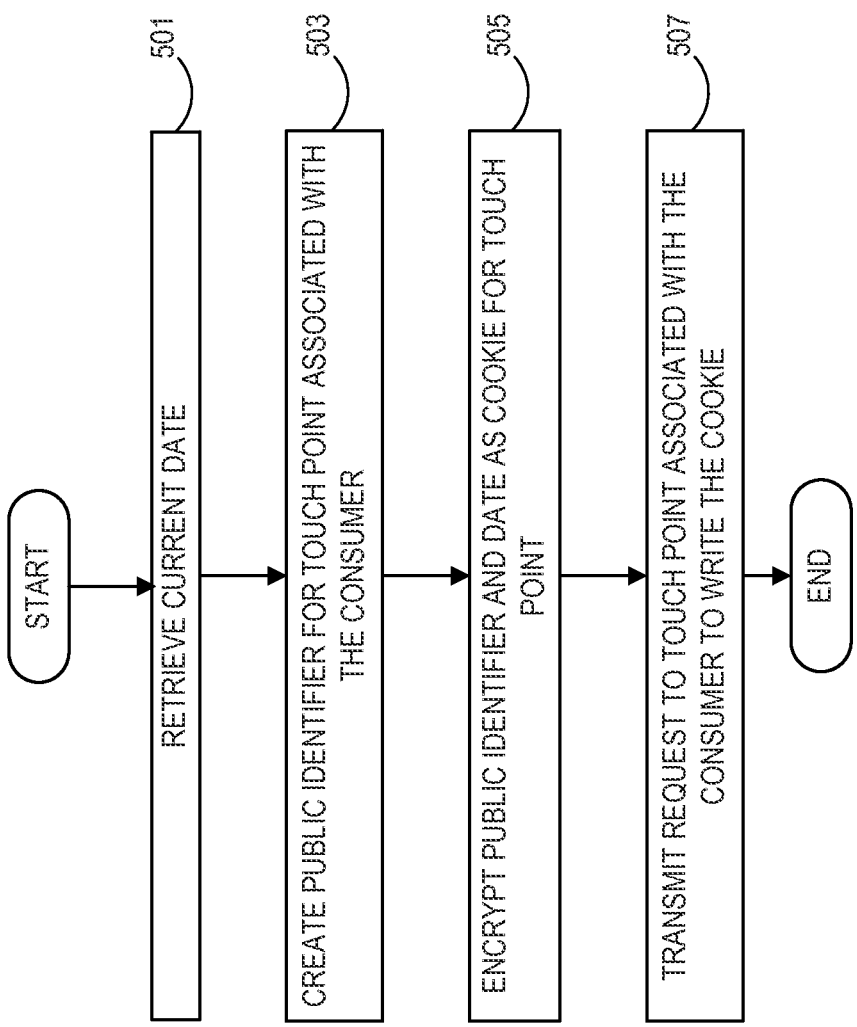
FIG. 5     EXEMPLARY COOKIE CREATION PROCESS

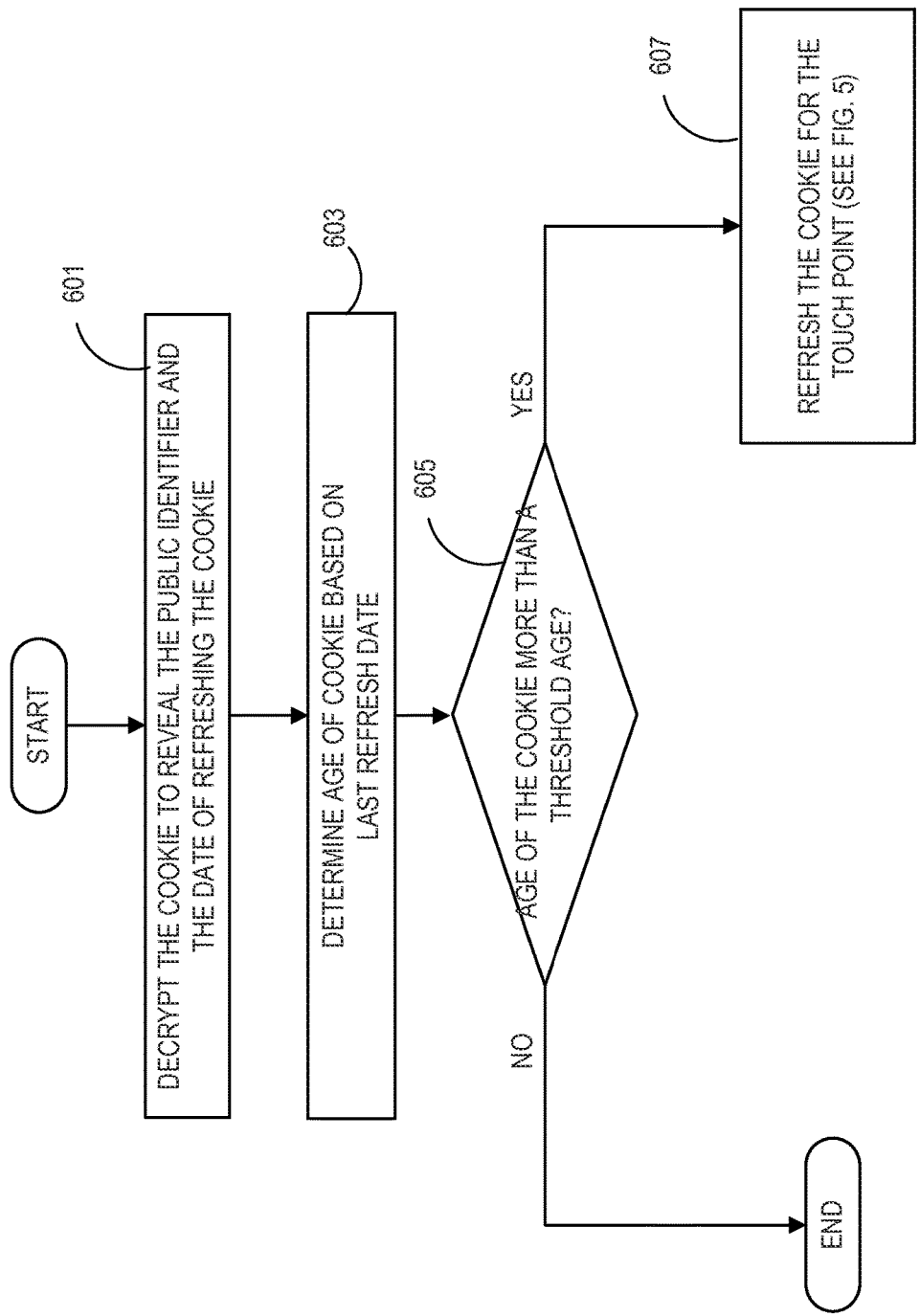

| MATCH | SECURE ID | PUBLIC ID | SYNC PARTNER ID | DSP ID |
|---|---|---|---|---|
| 1 | | 38fhns66r | 23hd8sj2 | |
| 2 | | 72fhds02 | 83ikge96 | |
| 3 | | 82gdus65 | fgts5473 | |

*FIG. 7A* EXEMPLARY IDENTIFIER SYNC/MATCH TABLE 1

| MATCH | SECURE ID | PUBLIC ID | SYNC PARTNER ID | DSP ID |
|---|---|---|---|---|
| 1 | | 38fhns66r | 23hd8sj2 | 86374uf7 |
| 2 | | 72fhds02 | 83ikge96 | 72536fi |
| 3 | | 82gdus65 | fgts5473 | tswn7465 |

*FIG. 7B* EXEMPLARY IDENTIFIER SYNC/MATCH TABLE 2

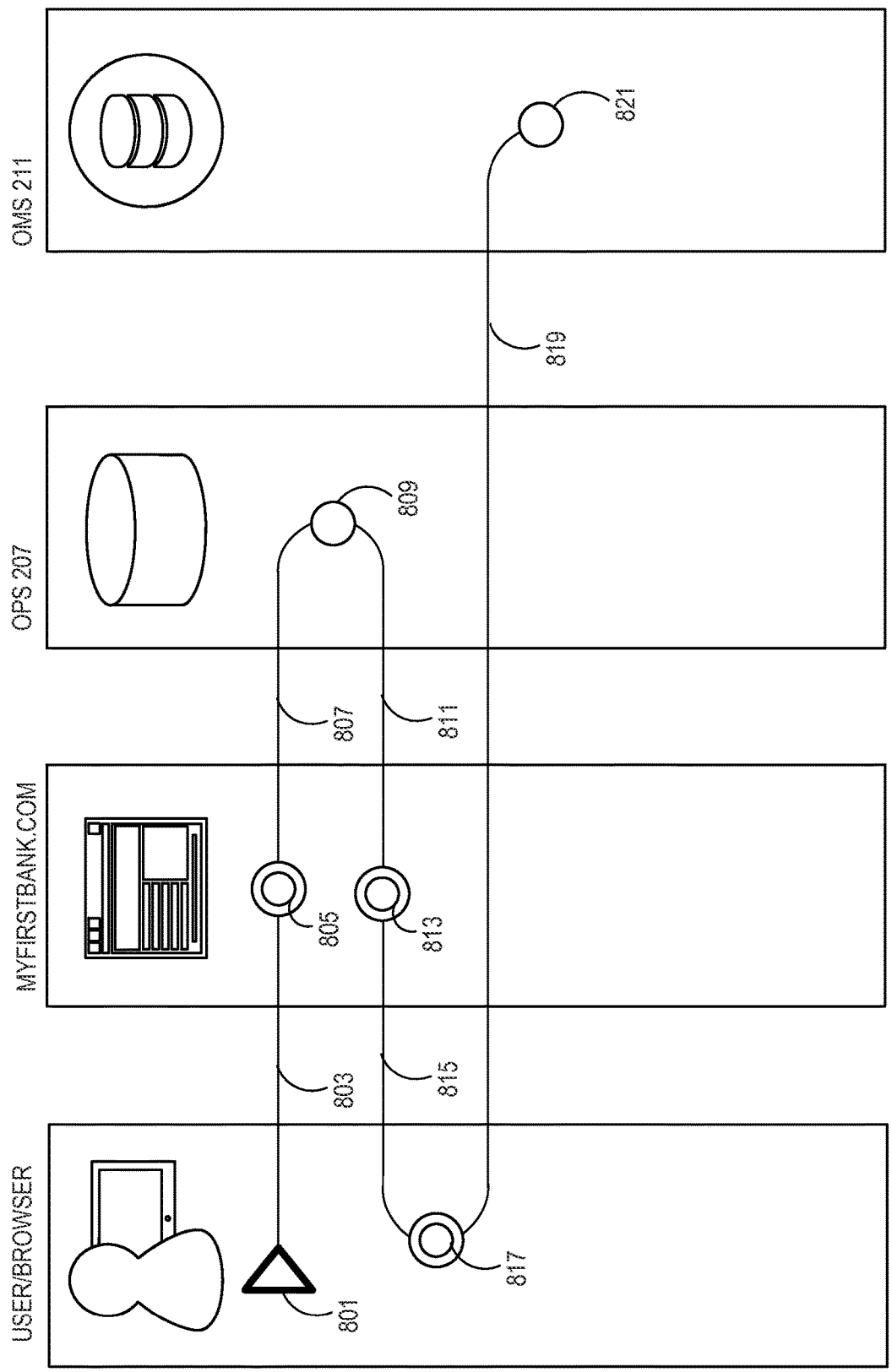
FIG. 8 EXEMPLARY ID MATCHING PROCESS

| MATCH | SECURE ID | PUBLIC ID | SYNC PARTNER ID | DSP ID |
|---|---|---|---|---|
| 1 | 6836295 | 38ffhns66r | 23hd8sj2 | 86374uf7 |
| 2 | 294618 | 72fhds02 | 83ikge96 | 72536fi |
| 3 | 204852 | 82gdus65 | fgts5473 | tswn7465 |

FIG. 9 EXEMPLARY IDENTIFIER SYNC/MATCH TABLE 3

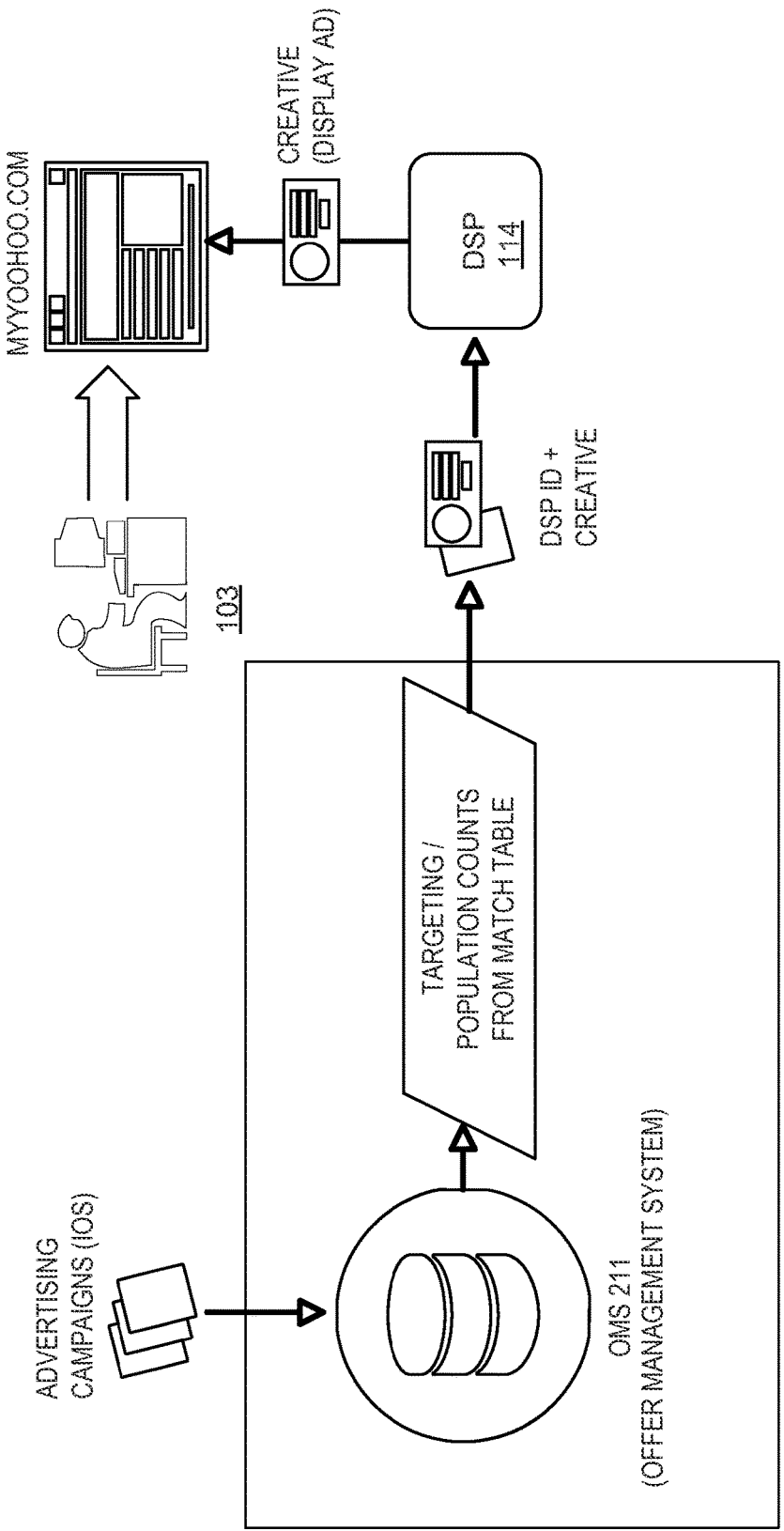
FIG. 10 EXEMPLARY PROCESS FOR SERVING AN EXEMPLARY MESSAGE

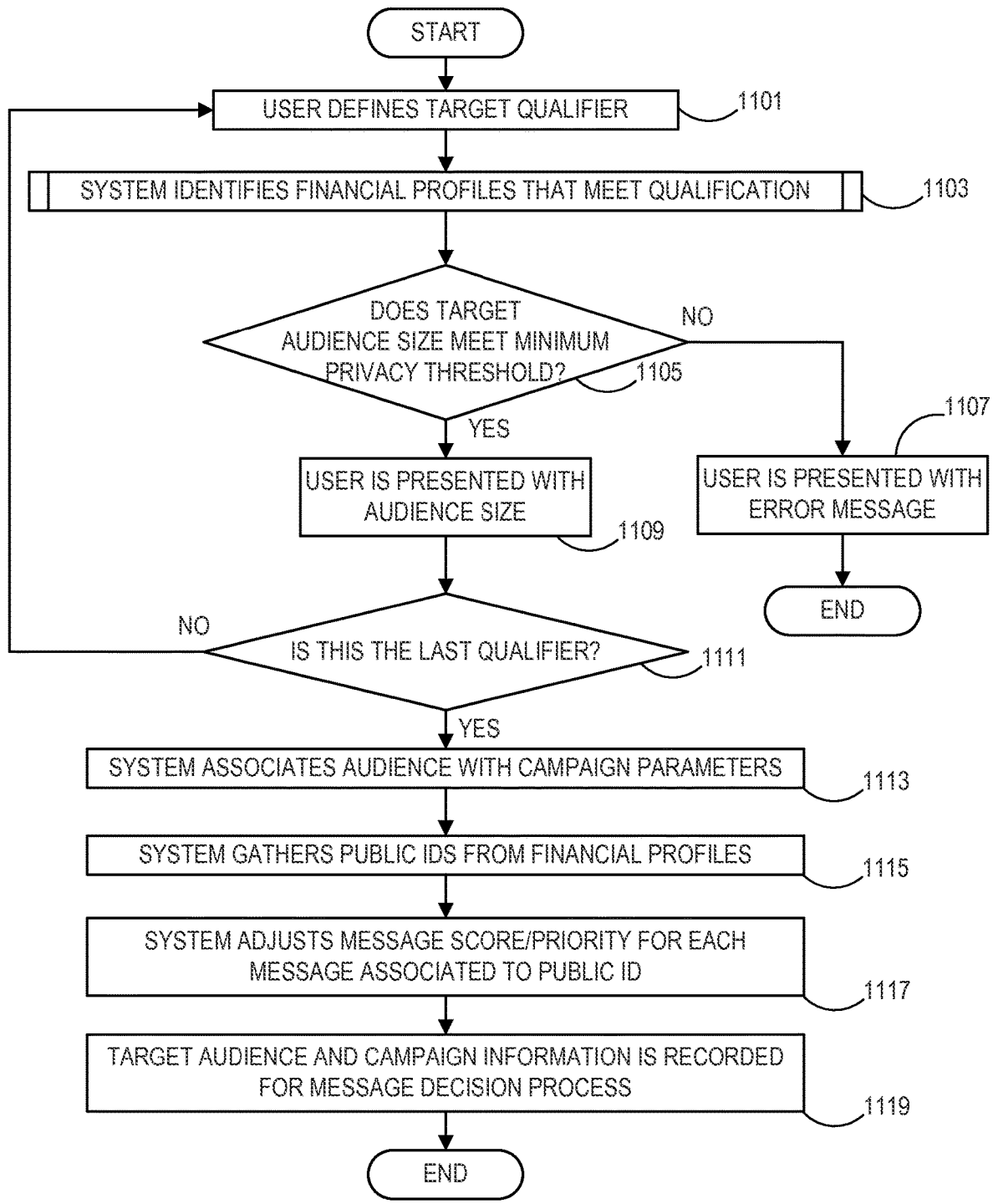
FIG. 11: EXEMPLARY PRE-TARGETING PROCESS

SYSTEM AND APPARATUS FOR IDENTIFIER MATCHING AND MANAGEMENT

CLAIM OF PRIORITY

This application claims the benefit of U.S. Provisional Patent Application No. 61/994,656, filed May 16, 2014, entitled, "SYSTEM AND METHODS FOR PURCHASED BASED TARGETING, DELIVERY, AND ATTRIBUTION OF MARKETING MESSAGES," incorporated herein by reference in its entirety.

TECHNICAL FIELD

The present systems and methods relate generally to electronic, computer-based targeted marketing systems, and more particularly to systems and methods for providing targeted marketing messages and offers to consumers using de-identified information from financial services.

BACKGROUND

Online (or Internet) advertising is a popular medium for delivering marketing advertisements and offers to potential consumers. In a typical example, a user accesses a website to view certain content (a news article, social media posts, etc.) and views an advertisement on the website alongside the content of the website. There are many variations of the ad in the above example, including pop-up advertisements, banner ads, e-mail marketing ads, instream video ads, mobile browser ads, in-app mobile ads, in-game ads, etc. Like traditional print-media advertisements, online advertising can be mass (e.g., everyone gets the same ad) or targeted (e.g., certain people get certain ads).

Generally, the more information known by an advertiser or their agent, the more targeted, specialized and potentially valuable advertisements become. Certain types of targeted marketing systems are known to be in use. The term "targeted marketing" generally refers to systems that enable the identification of particular classes or segments of consumers and the delivery of specialized advertisements to such consumers. Consumers are often segmented into classes and subclasses based on age, gender, geography, socio-economic status, history of purchases, and other indicia. The specialized targeted advertisements provided to these identified classes of consumers can include advertisements for products or services known to be of interest to that class of consumer. Targeted advertisements may also include special discounts on product purchases, coupons, rewards program points, or other similar incentives for specific products or services.

Traditionally, marketers rely on general information such as their own historical sales data or common geographic data in order to target advertisements (in the form of mailers, television advertisements, etc.) to customers. Marketers may also rely on audience composition data for television or printed publications, such as Nielsen ratings. While this type of targeted marketing does provide some benefit over undirected, mass marketing, it is not as specialized or precise as most advertisers would prefer. Even with the advent and widespread use of the Internet (and Internet advertisements), targeted marketing still does not reach the level of detail for optimum effectiveness. Furthermore, advertisers' ability to target consumers and track conversion rates is limited to their respective sales data. Conversion rate refers to any subjective measure of advertising effectiveness, for example completed purchases online or at a local retail location in response to an advertisement, or sign-ups for a newsletter in response to an advertisement. Because of these limitations, advertisers are unable to construct a view of the customer's overall spending behavior when creating marketing programs.

Online financial services provided by financial institutions such as banks, credit unions, savings & loans, and brokerage institutions are able to track individual consumer spending and are becoming increasingly popular among consumers as a way to effectively manage their finances. Online financial services are typically managed by a consumer via a financial institution portal, where users are typically provided with a listing of their accounts, and a further sub-listing of their recent transactions associated with those accounts. Each transaction will often include the date of the purchase or transaction, the amount of the transaction, the form in which the transaction occurred (i.e., check, credit card, etc.), and the retailer, service provider, or other establishment with which the transaction occurred. Additionally, with the advent and increased use of mobile devices (e.g., cell phones, smart phones, tablets, portable game consoles, etc.), consumers have constant access (e.g., through a mobile application) to their online financial services and accounts.

In order to provide detailed and up-to-date information regarding transactions, purchases, and accounts to online banking portal users, banks and other financial service providers must keep thorough records of those transactions, and employ highly-sophisticated operational systems to maintain and organize such information. Accordingly, banking systems can provide a rich intelligence about the purchasing habits and propensities of consumers.

However, the customer transaction data held by banks is highly confidential. As a result, traditional advertisers have not had access to this data; thus, transaction data has not been used to target customers or measure the effectiveness of an advertising campaign.

BRIEF SUMMARY OF THE DISCLOSURE

According to a particular embodiment, a computer system for matching private and public identifiers, the system including at least one processor, wherein the at least one processor is configured to: A) facilitate transmitting a public identifier to a particular computing system; B) receive an indication that the particular computing system has accessed non-public data; C) based on receiving the indication that the particular computing system has accessed the non-public data, facilitating transmission of a beacon to the particular computing system, wherein the beacon includes a secure identifier associated with the particular computing system based on the non-public data; D) receiving a request based at least in part on the beacon from the particular computing system, wherein the request includes the secure identifier and the public identifier; and F) store the public identifier and the secure identifier in a match table.

In various embodiments, a computer-implemented method for matching private and public identifiers, the method including the steps of: A) facilitating transmitting a public identifier to a particular computing system; B) receiving an indication that the particular computing system has accessed non-public data; C) based on receiving the indication that the particular computing system has accessed the non-public data, facilitating transmission of a beacon to the particular computing system, wherein the beacon includes a secure identifier associated with the particular computing system based on the non-public data; D) receiving a request based at least in part on the beacon from the particular computing system, wherein the request includes the secure identifier and the public identifier; and E) storing the public identifier and the secure identifier in a match table.

According to one or more embodiments, a computer system for matching private and public identifiers, the system including: A) a first portion of a distributed architecture located behind a firewall of a financial institution; and B) a second portion of the distributed architecture located outside of the firewall of the financial institution communicatively coupled to the first portion of the distributed architecture wherein the second portion of the distributed architecture is configured for: 1) receiving a public identifier matched with a secure identifier associated with a particular consumer via a response to a beacon from the particular consumer's computing device, wherein the beacon is transmitted to the particular consumer's computing device via a secure online portal associated with the financial institution; 2) storing the matched public and secure identifier associated with the particular consumer in a match table; 3) creating a segment including secure identifiers associated with one or more categories, wherein at least one category is based on data from the financial institution; 4) matching the at least one segment to the public identifier associated with the particular consumer based on the match table; and 5) based on matching the at least one segment to the public identifier, facilitating delivering of a particular message to the particular consumer's computing device.

In at least one embodiment, a computer-implemented method for matching private and public identifiers, the method including the steps of: A) providing a first portion of a distributed architecture located behind a firewall of a financial institution; and B) providing a second portion of the distributed architecture located outside of the firewall of the financial institution communicatively coupled to the first portion of the distributed architecture wherein the second portion of the distributed architecture is configured for: 1) creating a public identifier to be associated with a particular consumer's computing system; 2) transmitting the public identifier to the particular consumer's computing system; 3) receiving a public identifier matched with a secure identifier associated with a particular consumer via a response to a beacon from the particular consumer's computing device, wherein the beacon is transmitted to the particular consumer's computing device via a secure online portal associated with the financial institution; 4) storing the matched public and secure identifier associated with the particular consumer in a match table; 5) creating a segment including secure identifiers associated with one or more categories, wherein at least one category is based on data from the financial institution; 6) matching the at least one segment to the public identifier associated with the particular consumer based on the match table; and 7) based on matching the at least one segment to the public identifier, facilitating delivering of a particular message to the particular consumer's computing device.

According to particular embodiments, a computer system for delivering targeted messages to a consumer including: A) a first portion of a distributed architecture located behind a firewall of a financial institution; and B) a second portion of the distributed architecture located outside of the firewall of the financial institution communicatively coupled to the first portion of the distributed architecture, wherein the system is configured for: 1) receiving, at the first portion of the distributed architecture, an indication that a particular consumer has logged into an account associated with the financial institution via a Internet-enabled computing system; 2) in response to receiving the indication that the particular consumer has logged into the account, transmitting, by the first portion of the distributed architecture, content to the particular consumer via the web-enabled computing system, wherein the content includes a call to a beacon service and a secure identifier associated with the particular consumer; 3) in response to transmitting the content, receiving a public identifier associated with the particular consumer at the second portion of the computing architecture from the beacon service; 4) storing, at the second portion of the computing architecture, the secure identifier and the public identifier in a match table; 5) creating a message segment including one or more secure identifiers associated with consumers with certain characteristics, wherein the message segment includes the secure identifier; and 6) transmitting a marketing message to the particular consumer based upon receiving an indication of an opportunity to deliver a marketing message based on the public identifier.

In some embodiments, a computer-implemented method for delivering targeted messages to a consumer including: A) providing a first portion of a distributed architecture located behind a firewall of a financial institution; and B) providing a second portion of the distributed architecture located outside of the firewall of the financial institution communicatively coupled to the first portion of the distributed architecture, wherein the method includes the steps of: 1) receiving, at the first portion of the distributed architecture, an indication that a particular consumer has logged into an account associated with the financial institution via a web-enabled computing system; 2) in response to receiving the indication that the particular consumer has logged into the account, transmitting, by the first portion of the distributed architecture, content to the particular consumer via the web-enabled computing system, wherein the content includes a call to a beacon service and a secure identifier associated with the particular consumer; 3) in response to transmitting the content, receiving a public identifier associated with the particular consumer at the second portion of the computing architecture from the beacon service; 4) storing, at the second portion of the computing architecture, the secure identifier and the public identifier in a match table; 5) creating a message segment including one or more secure identifiers associated with consumers with certain characteristics, wherein the message segment includes the secure identifier; and 6) transmitting a marketing message to the particular consumer based upon receiving an indication of an opportunity to deliver a marketing message based on the public identifier.

According to at least one embodiment, a computer system for managing public identifiers, the computer system including at least one processor configured to: A) receive a public identifier associated with the system from a touch point; B) decrypt the public identifier, wherein: a) the public identifier includes an encrypted public ID and a last refresh date; and b) the last refresh date is the date the public identifier was set; C) determine whether the last refresh date is more than a particular time threshold; D) upon determining that the last refresh date is more than the particular time threshold, create a refreshed public identifier for the public ID by encrypting the public ID and a new refresh date to create the refreshed public identifier; and E) transmit the refreshed public identifier to the touch point.

In various embodiments, a computer-implemented method for managing public identifiers, the method including the steps of: A) receiving a public identifier associated with the system from a touch point; B) decrypting the public identifier, wherein: a) the public identifier includes an encrypted public ID and a last refresh date; and b) the last refresh date is the date the public identifier was set; C) determining whether the last refresh date is more than a particular time threshold; D) upon determining that the last refresh date is more than the particular time threshold, creating a refreshed public identifier for the public ID by encrypting the public ID and a new refresh date to create the refreshed public identifier; and E) transmitting the refreshed public identifier to the touch point.

According to one or more embodiments, a computer system for reducing the amount of processing time to refresh a cookie, the system including at least one processor configured to: A) in response to receiving an opportunity to deliver content to a touch point, create a cookie for the touch point, the cookie including an encrypted public ID associated with the touch point and a last refresh date corresponding to the date and time the opportunity was received; B) based upon receiving the cookie from the touch point, determine whether to refresh the cookie without looking up the cookie's creation date by: 1) decrypting the last refresh date; and 2) determining whether the last refresh date is more than a particular time threshold; and C) upon determining that the last refresh date is more than the particular time threshold, create a refreshed cookie for the public ID by encrypting the public ID and a new refresh date corresponding to the date the cookie was received to create the refreshed public identifier; and D) transmit the refreshed cookie to the touch point.

In one or more embodiments, a computer-implemented method for reducing the amount of processing time to refresh a cookie, the including the steps of: A) in response to receiving an opportunity to deliver content to a touch point, creating a cookie for the touch point, the cookie including an encrypted public ID associated with the touch point and a last refresh date corresponding to the date and time the opportunity was received; B) based upon receiving the cookie from the touch point, determining whether to refresh the cookie without looking up the cookie's creation date by: 1) decrypting the last refresh date; and 2) determining whether the last refresh date is more than a particular time threshold; and C) upon determining that the last refresh date is more than the particular time threshold, creating a refreshed cookie for the public ID by encrypting the public ID and a new refresh date corresponding to the date the cookie was received to create the refreshed public identifier; and D) transmitting the refreshed cookie to the touch point.

According to a particular embodiment, a computer system for matching private and public identifiers, the system including: A) a first portion of a distributed architecture located behind a firewall of a financial institution; and B) a second portion of the distributed architecture located outside of the firewall of the financial institution communicatively coupled to the first portion of the distributed architecture wherein the second portion of the distributed architecture is configured for: 1) receiving a cookie matched with a secure identifier associated with a particular consumer via a response to a beacon from the particular consumer's computing device, wherein the beacon is transmitted to the particular consumer's computing device via a secure online portal associated with the financial institution; 2) decrypting the cookie to reveal a public identifier; 3) matching the public identifier to the secure identifier; 4) storing the matched public and secure identifier associated with the particular consumer in a match table; 5) creating a segment including secure identifiers associated with one or more categories, wherein at least one category is based on data from the financial institution; 6) matching the at least one segment to the public identifier associated with the particular consumer based on the match table; and 7) based on matching the at least one segment to the public identifier, facilitating delivering of a particular message to the particular consumer's computing device.

In at least one embodiment, a computer-implemented method for matching private and public identifiers, the method including the steps of: A) providing a first portion of a distributed architecture located behind a firewall of a financial institution; and B) providing a second portion of the distributed architecture located outside of the firewall of the financial institution communicatively coupled to the first portion of the distributed architecture wherein the second portion of the distributed architecture is configured for: 1) receiving a cookie matched with a secure identifier associated with a particular consumer via a response to a beacon from the particular consumer's computing device, wherein the beacon is transmitted to the particular consumer's computing device via a secure online portal associated with the financial institution; 2) decrypting the cookie to reveal a public identifier; 3) matching the public identifier to the secure identifier; 4) storing the matched public and secure identifier associated with the particular consumer in a match table; 5) creating a segment including secure identifiers associated with one or more categories, wherein at least one category is based on data from the financial institution; 6) matching the at least one segment to the public identifier associated with the particular consumer based on the match table; and 7) based on matching the at least one segment to the public identifier, facilitating delivering of a particular message to the particular consumer's computing device.

BRIEF DESCRIPTION OF THE DRAWINGS

FIG. 2 shows an exemplary targeted message/advertisement delivery process according to one embodiment of the present disclosure.

FIG. 3 shows an exemplary cookie writing and syncing process according to one embodiment of the present disclosure.

FIG. 4 shows an exemplary cookie creation process according to one embodiment of the present disclosure.

FIG. 5 shows an exemplary cookie creation process according to one embodiment of the present disclosure.

FIG. 6 shows an exemplary cookie refresh process according to one embodiment of the present disclosure.

FIGS. 7A & 7B show exemplary identifier sync/match tables according to one embodiment of the present disclosure.

FIG. 8 shows an exemplary identifier matching process according to one embodiment of the present disclosure.

FIG. 9 shows an exemplary identifier sync/match table according to one embodiment of the present disclosure.

FIG. 10 shows an exemplary process for serving an exemplary message according to one embodiment of the present disclosure.

FIG. 11 shows an exemplary pre-targeting process for according to one embodiment of the present disclosure.

DETAILED DESCRIPTION

Figure 1:
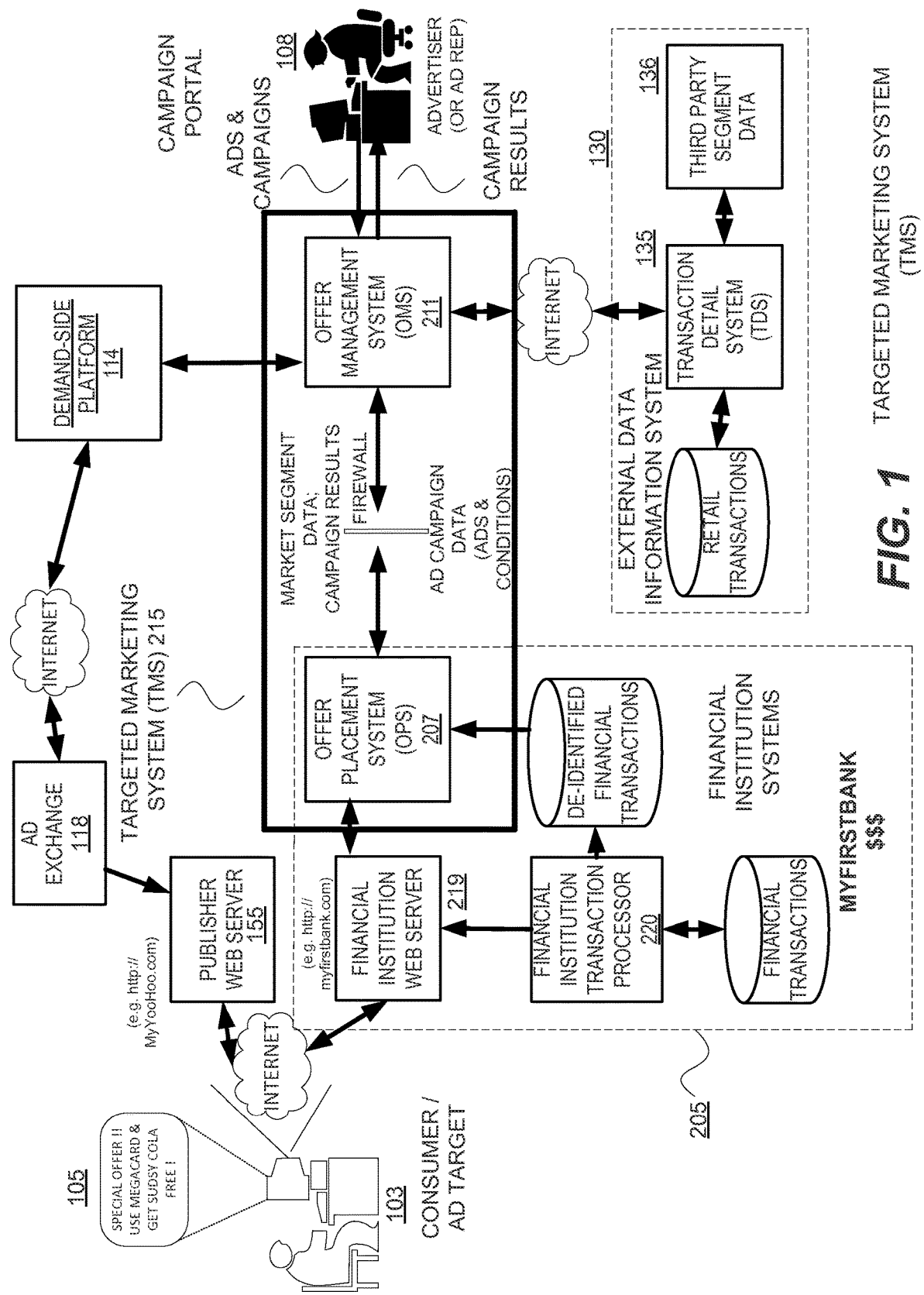
FIG. 1 shows an exemplary targeted marketing system according to one embodiment of the present disclosure.

This application is related to and incorporates by reference herein the following U.S. and international (PCT) patent applications:

U.S. Provisional Patent Application No. 61/994,656, entitled, "System and Methods for Purchased Based Targeting, Delivery, and Attribution of Marketing Messages", filed May 16, 2014;

U.S. patent application Ser. No. 12/486,131, entitled "System and Methods for Delivering Targeted Marketing Offers to Consumers Via an Online Portal", filed on Jun. 17, 2009;

U.S. patent application Ser. No. 12/486,140, entitled "Offer Placement System and Methods for Targeted Marketing Offer Delivery System", filed on Jun. 17, 2009;

U.S. patent application Ser. No. 12/486,146, entitled "Offer Management System and Methods for Targeted Marketing Offer Delivery System", filed on Jun. 17, 2009;

U.S. patent application Ser. No. 12/486,167, entitled "System and Methods for Offer Realization and Redemption in a Targeted Marketing Offer Delivery System", filed on Jun. 17, 2009;

U.S. patent application Ser. No. 12/486,204, entitled "System and Methods for Merging or Injecting Targeted Marketing Offers with a Transaction Display of an Online Portal", filed on Jun. 17, 2009;

International (PCT) patent application no. PCT/US2009/047652, entitled "System and Methods for Delivering Targeted Marketing Offers to Consumers Via an Online Portal", filed on Jun. 17, 2009; and U.S. patent application Ser. No. 14/213,267, entitled "System and Methods for Delivering Targeted Marketing Offers to Consumers Via a Transaction Detail System", filed on Mar. 14, 2014, the disclosures of which applications are incorporated by reference as if the same were fully set forth herein.

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Further, one or more references are incorporated by reference herein. Any incorporation by reference is not intended to give a definitive or limiting meaning of a particular term. In the case of a conflict of terms, this document governs.

Glossary

Cookie: a cookie is a data value stored in a user's web browser upon request of a web server (e.g., upon accessing a website). When the user returns to that website (or any page or service using that site's domain), the web browser may send the data value back to the website. Thus, in various embodiments, a cookie is a mechanism for a website to recall the state of a user's previous visit so that the website can, for example, display a shopping cart with items that the user selected for purchase at a prior visit to the website. As will be further discussed herein, a cookie may be used to place an identifier, such as a Public ID, on a Touch Point.

Identifier: Any parameter used to recognize a particular consumer. May include a Touch Point ID (as further described below), a Public ID, a Secure ID, a publisher ID, a demand-side platform (DSP) ID, an ad exchange ID, etc. As described herein, a Public ID is used to identify a consumer's Touch Point when the consumer is browsing non-banking websites or using a non-banking application. As further described herein, a Secure ID is used to associate a consumer's Touch Point with a financial institution consumer. The financial institution may process transactional data according to an internal financial institution procedure to remove specific consumer- or account-identifying information. The identifying information may then be replaced with an anonymous secure identifier, such as the Secure ID.

Market Segment (also known as a Segment or Targeted Consumer Segment): a group of consumers to which at least one Targeted Marketing Offer (TMO, as defined below) or Targeted Marketing Message (TMM, as defined below) applies based on the specifics of a campaign for delivering a TMO or TMM. As further described below, TMOs and TMMs are delivered to particular consumers that, in various embodiments, are part of a particular Market Segment, defined by one or more characteristics described or selected as part of a campaign. The group of consumers may be defined by: location of prior purchases, geography, deposit information, the spend at a particular retailer or set of retailers, the spend at a particular type of retailer (e.g., restaurants, gas stations, clothing stores, etc.) or the total spend. Generally a subset of the entire population of available consumers. Generally synonymous with "segment." For example, a segment may be defined by spend data along with other data on the consumer such as location (based on geofencing or other locationing system), time of the spend, type of device, web visit habits, or other datasets. Datasets may be combined from any number of parties (such as spend data from a financial data source, sales data from an advertiser, and demographic or psychographic data from a third party provider).

Targeted Marketing Message (TMM): a creative digital message or advertisement (text, images, audio, video, etc.) displayed by a publisher. As described herein, TMMs are presented to consumers on a non-banking website or other Touch Point, such as a mobile application.

Targeted Marketing Offer (TMO): an offer to deliver a particular reward, refund, financial payment, offer redemption payment, or other incentive to a consumer. As described herein, TMOs are presented to consumers during the consumers' online banking sessions via each consumer's financial institution portal or during a non-banking online session.

Targeted Marketing System (TMS): overall system as described herein for creating targeted marketing campaigns, Targeted Marketing Segments, creating, managing, and matching various identifiers, and delivery or facilitating delivery of TMMs associated with targeted marketing campaigns to consumers via financial institution portals or non-banking publishers, maintaining privacy and security amongst financial institution clients (i.e., consumers), and performing a host of other tasks and processes as described in detail herein. Generally includes an offer management system (OMS), one or more offer placement systems (OPS), and other additional components as described herein. As further described below, in one embodiment, may be operatively connected to one or more demand-side platforms, one or more advertising exchanges, and/or one or more publishers. In a second embodiment, may include the functionality of a demand-side platform, an advertising exchange, and/or a publisher.

Touch Point: a web browser or any application that can access the Internet on a consumer's electronic device (such as a laptop, tablet, smartphone, smartwatch or other wearable technology, e-reader, desktop computer, vehicle infotainment system, public kiosk, video game console, handheld game console, connected appliance, etc.).

Touch Point ID: an identifier associated with the Touch Point, such as a MAC address, Bluetooth address, IP address, serial number, phone identifier (such as IMEI, IMSI, MEID, or ICCID), or advertising ID for a mobile device and/or mobile applications, such as Apple ID for Advertisers (IDFA), Android ID, Google Advertising ID, or the like. The identifier may also be associated with the consumer using the Touch Point, such as a mobile phone number, user ID, or email address. In various embodiments, the identifier may be used by the TMS as the Public ID. In some embodiments, the Public ID for a particular consumer may be a derivative of an IDFA, such as, for example, a hash value of an IDFA associated with the particular consumer.

Description of Exemplary Targeted Marketing System, Components, and Processes

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

As discussed above, financial institutions track individual consumer spending; however, this rich source of information is not directly available to online advertisers. When that information is made available to advertisers, the advertiser's use of the data is tightly controlled to protect the privacy and confidentiality of the consumer. For example, as described in U.S. patent application Ser. No. 12/486,140, entitled "Offer Placement System and Methods for Targeted Marketing Offer Delivery System", filed on Jun. 17, 2009, now U.S. Pat. No. 8,595,065, a third-party may be allowed access to consumer spending to provide TMOs via the financial institution's online banking portal. That information is first de-identified (consumer- or account-identifying information is removed). The identifying information may then be replaced with an anonymous secure identifier, such as the Secure ID described in more detail below.

As described in more detail below, the TMS 215 uses technical means to link a consumer that accesses an online banking portal with a consumer accessing a non-banking website or application. Importantly, the technical means make use of only anonymous, de-identified information. In various embodiments, the technical means do not rely on any transfer of code or data directly to the consumer by the TMS 215 during an online banking portal session, other than (in some instances, as further discussed below) transfers of targeted marketing offers approved by the financial institution, beacons, and the like, as described herein.

In this way, an online advertiser can make use of de-identified, anonymous transaction data in targeting consumers on non-banking websites.

Exemplary Targeted Marketing Advertisement Placement System Overview

For purposes of example and explanation of the fundamental processes and components of the disclosed systems and methods, reference is made to FIG. 1, which depicts an exemplary environment for operations of a targeted marketing system (TMS) 215. In the exemplary environment shown in FIG. 1, a particular consumer 103 is the recipient of a TMO or TMM 105, delivered via the consumer's electronic Touch Point. The TMO or TMM 105 is generated by an advertiser 108, and delivered to the particular consumer 103 by the TMS 215 as the result of processes as described in detail herein.

As shown in FIG. 1, the particular consumer 103 may connect to a financial institution web server 219 (such as the imaginary http://www.myfirstbank.com or any secure banking portal) or publisher web server 155 (such as the imaginary http://MyYooHoo.com or any other web content publisher). The TMS 215 can be used by an advertiser 108 to target consumers connected to either one of these two types of web servers (or other types of web servers).

The TMS 215 comprises various networked computer-implemented components or modules that cooperatively allow an advertiser to identify a Market Segment of consumers that the particular consumer 103 belongs to, generate or select a suitable TMO or TMM for consumers (including particular consumer 103) within an identified Market Segment, and deliver that offer or message to the consumer and other consumers in the identified Market Segment. Various methods for determining Market Segments are described herein and in related incorporated U.S. patents of the applicant hereof.

According to one aspect, the TMS 215 comprises or is in communication with selected ones of the following components:

(A) an OPS 207 and OMS 211, which, in various embodiments, together facilitate the identification of consumer Market Segments based on de-identified financial transactions or de-identified retail transactions, among other functions. The OPS 207 directly interacts with a financial institution system 205 and is separated from the OMS 211 by a firewall. The OPS 207 contains or has access to and pulls financial transaction information from the financial institution 205. The OMS 211 provides a campaign portal for advertisers or their agents, such as advertiser 108, to allow the advertisers to establish and manage advertising campaigns, (in certain embodiments, an advertiser may also manage a campaign at a demand-side platform, as further discussed below) select Segments of users for a campaign, generate and select messages for delivery, see advertisement campaign results, provide messages to other subsystems for delivery, among other functions. As will be understood by one of ordinary skill in the art, advertisers or their agents may interact directly with the OMS 211 and/or campaign portal or may be represented by a third party that creates, runs, and manages an advertising campaign based on preferences, characteristics, and/or requirements of the advertisers or their agents. An example TMS is that provided by Cardlytics.

The TMS 215 also includes components for matching various identifiers used by the OPS 207, OMS 211, and third-party systems, including an ID service and beacon service. As described herein, these services are part of the OMS 211. In other embodiments, these services may be separate from the OMS 211.

As shown in FIG. 1, the OPS 207 operates with the financial institution 205 and is separated from the OMS 211 by a firewall. In various embodiments, this configuration protects the privacy of the financial institution customers and ensures that only anonymous transaction data is used by the OMS 211 and available to advertiser 108 to create campaigns. In these embodiments (and others), the anonymous transaction data is aggregated before being transmitted to the OMS 211 to further protect customers' identities. Although a particular distributed architecture is shown in FIG. 1, the OPS 207 and OMS 211 may be configured in any suitable way that protects the privacy of the financial institution customers.

(B) a demand-side platform 114 (sometimes referred to as a "DSP") is coupled to the offer management system 211 and communicates with an advertisement exchange (ad exchange) 118. In particular embodiments, the demand-side platform 114 receives various Segments from the OMS. In further embodiments, the demand-side platform 114 is configured to manage an advertiser's campaign (e.g., the advertiser or the advertiser's agent interacts with the demand-side platform to create and manage campaigns based on Segments received from the OMS opposed to the advertiser interacting with the OMS).

The demand-side platform 114 may be operated by a third-party and not part of the TMS, as shown in FIG. 1. In other embodiments, the functionality of the demand-side platform is included within the TMS 215. In these embodiments, the TMS 215 communicates directly with the ad exchange 118.

In additional embodiments, the TMS 215 communicates directly with the publisher web server 155 (e.g., may include the functionality or be a demand-side platform and/or an ad exchange).

(C) a publisher web server 155 that receives a selected TMM or TMO, e.g. the message or offer 105, or a link to the TMM or TMO, and delivers that message or offer (or link) to the particular consumer 103.

(D) a connection to one or more financial institution systems 205, such as described in the incorporated U.S. patents.

(E) a connection to one or more retail data information systems 130, which obtain retail transaction data corresponding to purchase transactions by consumers. In various embodiments, the TMS is configured to receive third party data such as third-party segmentation data and/or data that may be used in combination with data received by the OPS to create Segments. In these embodiments, this third-party data may be used to refine or supplement Segments created at the OMS.

(F) a transaction detail system (TDS) 135, which receives and processes retail transaction data from one or more retail institutions or other third parties (136) and provides such information in de-identified form to the offer management system (OMS) 211 for use in defining Market Segments.

In various embodiments, an advertiser connects (in some embodiments, through a third party) to the targeted marketing system (TMS) 215 to create a targeted marketing campaign. According to particular embodiments, the advertiser selects or enters various attributes or parameters of consumers the advertiser wishes to target. Within the TMS, the OPS 207 and OMS 211 are separated via a firewall to provide for isolation of personal financial transaction information from advertisers (e.g., the OMS 211 and OPS 207 may be part of a distributed computing architecture). De-identified transaction data is sent to the OPS 207 by a respective financial institution 205, which may aggregate and transmit the aggregated, de-identified transaction data to the OMS 211. Alternatively, or additionally, de-identified retail transactions are processed by the retail data information system 130 and provided to the OMS 211. In many embodiments, transaction data for a particular consumer is de-identified (e.g., any personally identifiable data is removed) and aggregated with information from other consumers, so as to further protect the particular consumer's privacy.

In particular embodiments, the de-identified transaction data is used by the advertiser 108 to create a targeted marketing campaign (e.g., a targeted marketing campaign includes one or more Segments of consumers (de-identified) that meet certain characteristics). The campaign may target consumers based on, for example, the consumer's spending at a certain retail location or category of retailer. The campaign may be defined based on any available information on consumers, such as consumer financial transactions, consumer retail transactions, or both in combination. However, the advertiser only has access to data that identifies attributes of Market Segments, and does not have access to consumers' personally identifiable information (PII), to the consumers, or to the consumers' individual transactions. In addition, each Market Segment has some minimum number of consumers. This protects consumer privacy by preventing the advertiser from learning about particular consumers.

According to one aspect, in which a targeted marketing offer (TMO) is delivered to the consumer via a banking portal (e.g. the consumer's bank FirstBank, with imaginary portal at https://myfirstbank.com), a financial institution maintains a financial institution system 205, which includes a financial institution transaction processor 220 and a financial institution web server 219. The financial institution web server 219 generates a banking portal, as described in the incorporated U.S. patent applications, with which the particular consumer 103 engages to view his or her banking transactions in a secure and private manner, and under certain conditions, receives a targeted marketing offer (TMO), based on being included in a Segment created from the campaign information entered or selected by the advertiser.

According to another aspect, a TMM is delivered to the particular consumer 103 via a publisher's portal (e.g. MyYooHoo, via the imaginary portal http://MyYooHoo.com). In this aspect, the targeted marketing system 215 matches the publisher portal particular consumer 103 with the banking portal particular consumer 103. In other words, the targeted marketing system 215 recognizes that the same particular consumer 103 has accessed both the MyYooHoo portal and the banking portal. Based on this matching, if the particular consumer 103 is included within a Segment is a target of the campaign created by the advertiser 108, a message 105 that has been selected by the advertiser 108 is delivered to the particular consumer 103. In this aspect, the particular message from the advertiser 108 may compete with messages put up for bid by other advertisers to the demand-side platform 114 and ad exchange 118, and selected by a bidding process, as will be described. An exemplary process of identifying and matching consumers that have accessed both the MyYooHoo portal and the banking portal will be described in more detail below.

Exemplary Identifier Match and Management Process

In order to deliver TMMs to consumers via a publisher's portal, the system, in various embodiments, matches a user's activity with a banking portal to a user's activity on the general Internet (e.g., viewing other websites, using various mobile applications, etc.). In a particular embodiment, as shown in FIG. 2, the system performs three overall processes 1) write a Public ID to a consumer's browser or system via a Touch Point (e.g., using a cookie) while the consumer is visiting a general Internet site (step 210); 2) match the Public ID to a Secure ID via a bank portal (step 220); and 3) serve a message to the consumer while the consumer is visiting a general Internet site based on the matched Public ID and Secure ID (step 230). In a second embodiment, the system reads a Public ID from the consumer's Touch Point and does not write a cookie. For example, in these embodiments (and others), the system may read a Touch Point Identifier, such as an identifier for advertisers (IDFA) or an equivalent on a mobile device (e.g., at step 220 above, without the need to write the Public ID at step 210).

Continuing with FIG. 2, in various embodiments, a particular consumer 103 interacts with a Touch Point to view the fictional website www.anysite.com. In various embodiments, the website is alternatively an application server, media server, or game server.

The Touch Point connects to the anysite.com webserver and requests content, as shown at 210. The webserver transmits content back to the Touch Point and the Touch Point displays the content for the particular consumer 103. In various embodiments, the Touch Point establishes a Hypertext Transfer Protocol (HTTP) connection with the webserver and the content is formatted in HTML. In other embodiments, the content is formatted for display within a mobile application. As shown at 260, the Touch Point displays the content from the webserver.

Along with the content, the website transmits code (e.g., HTML or Javascript) that directs the Touch Point to request additional content from the offer management system (OMS) 211. This request for additional content enables the system to write a cookie or other identifier to the particular consumer 103's browser or mobile device (e.g., for example, if the user is using a mobile application instead of a browser). In various embodiments, the cookie or other identifier includes a Public ID for the Touch Point. In some embodiments, the cookie value or other identifier is the Public ID. In the example shown at 210, the OMS 211 creates a Public ID and writes a cookie that includes the Public ID. As will be understood by one of ordinary skill in the art, the system may be configured to write the cookie or other identifier via a number of different processes, for example by using a sync partner as further discussed below regarding FIG. 3.

In further embodiments, as discussed herein, the system is configured to receive an identifier associated with a mobile device (e.g., an Apple IDFA, Google ID, Android ID, etc.). In these embodiments (and others), the system is configured to receive the mobile device identifier at step 220 (below), without writing an identifier at step 210 above.

Continuing with FIG. 2, at step 220, a consumer directs a Touch Point to connect to a financial institution vehicle, which may be, for example, an online banking portal, one or more applications developed by the financial institution for different Touch Points, one or more emails sent by a financial institution, an email sent by a financial institution partner, etc.

In various embodiments, at least partially in response to the user interacting with the financial institution vehicle, the financial institution requests content from an OPS 207. The content requested from the OPS may be any suitable content, such as a TMM or TMO to be displayed to the user, as further discussed in U.S. patent application Ser. No. 12/486,140, entitled "Offer Placement System and Methods for Targeted Marketing Offer Delivery System", filed on Jun. 17, 2009, now U.S. Pat. No. 8,595,065, which is incorporated herein by reference in its entirety and other related patents and patent applications. As shown in the example at 262, the particular consumer 103's web browser displays an online banking portal along with the content from the OPS 207. Alternatively, the OPS 207 may only deliver code that is not apparent to the consumer.

In various embodiments, the OPS 207 transmits a TMO and a beacon with a Secure ID with the content to the Touch Point. In particular embodiments, the Secure ID is an anonymous identifier for particular consumer 103 in the online banking system. In various embodiments, the beacon is an instruction for the consumer's Touch Point to make a request to a beacon service associated with the OMS 211. In one embodiment, the beacon may be a single pixel image HTML code with a URL pointing to the OMS 211 beacon service. The beacon causes the Touch Point to connect to the OMS 211 and transmit the Secure ID and Public ID. The Public ID, in various embodiments, is a mobile device identifier, such as an Apple IDFA, Google ID, Android ID, etc. In particular embodiments, the Public ID is included in a cookie written to the Touch Point at step 210, above. Alternatively, the Touch Point may transmit the Public ID separately from the beacon.

As a result, the OMS 211 is able to match the Secure ID and Public ID of the particular consumer 103's Touch Point. This matching is done without any personally identifiable information, such as name, account number(s), social security number, etc. This exemplary matching process will be further discussed with regards to FIG. 8 (part 2), below. The identifiers may be obfuscated to further protect the anonymity of the consumer. For example, the identifier may be encoded (conversion from one format to another) or encrypted (encoded using a key such that it can only be decoded with a matching key).

Once the Secure ID and Public ID for a particular consumer are matched, the system can target the particular consumer 103 with messages based on de-identified financial institution data even when the particular consumer 103 is not connected to the financial institution portal. As shown in FIG. 2, the particular consumer 103 accesses a website http://MyYooHoo.com. Because the Public ID for particular consumer 103 matches the Secure ID, certain de-identified details about the particular consumer 103's spending are known, and may be used to send a TMM to the particular consumer 103's Touch Point. This exemplary targeting process will be further discussed in regards to FIG. 10 (part 3), below.

The complete process may be more easily described in three parts, although it should be understood that these parts discussed herein may operate in order as part of the process, in a different order than as described, and/or at substantially the same time.

Part 1: Public Identifier Creation

As shown in FIG. 2, in various embodiments, the system is configured to write a cookie or other identifier to a consumer's web browser (or other suitable system, such as a mobile device). In particular embodiments, the cookie value may act as the Public ID. In various embodiments, the cookie value may include the Public ID, but may not be the Public ID itself (e.g., as discussed below, the cookie value may represent encrypted information, such as the Public ID). The system may be configured to write this cookie or other identifier in at least two ways.

Public Identifier Creation without Sync Partner

When a consumer accesses a Touch Point webserver (e.g., connects to the anysite.com webserver 260 and requests content as shown at 210), the webserver transmits content back to the Touch Point and the Touch Point displays the content for the particular consumer 103. Along with the content, the website transmits code (e.g., HTML or Javascript) that directs the Touch Point to request additional content from the offer management system (OMS) 211.

FIG. 4 is a flowchart illustrating the process of creating a Public ID and/or cookie value for the particular consumer 103's Touch Point. In one embodiment, as shown by step 401, the code transmitted to the Touch Point is an HTML code for a single pixel image with a URL that points to the OMS 211. In response to this code, the Touch Point then requests the additional content from the OMS 211. In one embodiment, the Touch Point establishes an HTTP connection with the OMS 211 and requests the single pixel image. The request may include one or more parameters to identify the particular consumer 103 or Touch Point. In particular embodiments, the one or more identification parameters may be attached directly to the request, for example, as a query string parameter in the URL or as data that is packaged along with the request. Some examples of identification parameters include, but should not be limited to, an IP address, one or more HTTP cookies, a device ID, a component ID (e.g., a MAC address), an Android ID or Apple IDFA, a username, one or more HTTP headers, at least one object in the POST or GET collection, parameters that identify the Touch Point (e.g., www.anysite.com's content, etc.), a time of day the particular consumer 103 has accessed the Touch Point, a geolocation of the particular consumer 103, a publisher identifier, and/or attached objects. Next, at step 403, the OMS 211 determines whether the request includes a recognized Public ID. If there is no recognized Public ID, then the system creates a new Public ID for the Touch Point, as shown at step 405 and FIG. 5. If there is a recognized Public ID, then the system refreshes that stored record, as shown at step 407 and FIG. 6. As will be understood from discussions herein, the Public ID may be directly stored on the Touch Point or may be included in a cookie value (e.g., the cookie value represents the Public ID, where the Public ID is encrypted).

FIG. 5 is a flowchart illustrating the process of creating a new Public ID for the Touch Point, where the Public ID is a cookie. Upon determining that there is no recognized Public ID for the Touch Point, the system is configured to create an entry in the OMS 211 public ID pool for the Touch Point. In at least one embodiment, the entry includes a unique identifier (i.e., the Public ID), a date of insertion (e.g., a date the unique identifier was created or last refreshed), any associated identification data from the request (e.g., any of the one or more identification parameters discussed above), and any behavioral data available with the request (e.g., the website visited, the search conducted to locate that website, the time spent viewing the website, and previous websites visited).

Starting at step 501, the OMS 211 retrieves the current date. At step 503, the OMS 211 creates a Public ID for the Touch Point. The Public ID may be a randomized number or combination of letters, numbers, and other characters. In various embodiments, at step 505 of FIG. 5, a cookie representing or including the Public ID is created by appending the Public ID and the current date, and encrypting the result. For example, if the Public ID is 38fhns66r and the date is Sep. 18, 2014, then the appended value may be formatted as: "38fhns66r|2014-09-18," where the "|" is a pipe character. The appended value is then encrypted as the cookie value. An example cookie value may be:

--- muZZVd5MOIJHYTf7jHcE+JhaU3OOQH7WQaq4Tk0bS/S4JMqZDQAuLO4ExhZGzHVn
TZGerIB56cWI2zc0kpkrlQ==

---

In this way, when the cookie value is read, the date that the cookie was written is decrypted and immediately available without requiring a database lookup. This reduces the processing load on the TMS and also reduces wait times for the consumer using the Touch Point. It also allows the TMS to avoid more cumbersome mechanisms for maintaining cookies and other Identifiers, such as setting the cookie to live forever on the consumer's Touch Point.

In various embodiments, if the Touch Point is capable of storing cookies, the OMS requests that the Touch Point store a cookie with the encrypted Public ID, as shown at step 507 of FIG. 5 and by FIG. 2 at 232. In alternative embodiments, a cookie is not necessary because the Public ID is associated with one or more of the identification parameters.

FIG. 6 is a flowchart illustrating the process of refreshing a stored cookie for the Touch Point. As will be understood by one of ordinary skill in the art, cookies may or may not be set with an expiration date. In these embodiments, after an expiration date for a particular cookie has passed, it is purged by the Touch Point. Beginning at step 601, the OMS 211 decrypts the cookie. The format of the cookie value is discussed above, and may consist of a Public ID and the last refresh date. At step 603, the OMS 211 reads the last refresh date to determine the age of the cookie. At step 605, the OMS 211 considers whether the cookie is more than a threshold age. In various embodiments where the cookie value is a combination of a Public ID and last refresh date, the OMS 211 can immediately determine the date without a lookup of the cookie value or the Public ID. In other embodiments, the OMS 211 may need to look up information associated with the Public ID in memory to determine when the cookie was last refreshed. If the cookie is not more than a threshold age, then the OMS 211 does not refresh the cookie. If the cookie is more than a threshold age, as shown at step 607, then the OMS 211 refreshes the cookie for the Touch Point. In these embodiments (and others), the OMS 211 refreshes the cookie by retrieving the current date, formatting the current date and existing Public ID as discussed above, encrypting the current date and the existing Public ID as the cookie value, then writing the cookie value as a new cookie. By creating a new cookie, the OMS 211 keeps the cookie alive and prevents it from being purged from the Touch Point. An exemplary process of refreshing a cookie is shown at FIG. 5.

In embodiments that rely on identification parameters rather than a cookie, when the system receives the identification parameters, the system looks up the Public ID and date of insertion for the Public ID. The system updates the date of insertion with the current date. The system may be configured to update the date of insertion in real-time or with a delay.

Public Identifier Creation with Sync Partner

It should be understood by one of ordinary skill in the art that the OMS 211 may utilize ID synching (e.g., via a partnership with other systems), such that consumers can be identified across domains without passage of private data.

As discussed below, this may be particularly important to identifying consumers across the publisher web server 155, the ad exchange 118, and demand-side platform 114.

FIG. 3 demonstrates how the OMS 211 may operate via a synching partnership. The synching partnership enables the OMS to record Public IDs to Touch Points it would otherwise not encounter. Also, as discussed in more detail below, the synching partnership enables the OMS to sync Public IDs with third party systems such as the ad exchange 118 and demand-side platform 114. In the embodiment shown in FIG. 3, at step 310, the particular consumer 103 accesses a website www.anysite.com via a Touch Point operating a web browser. The Touch Point establishes a connection 312 with the website and transmits a message requesting content from the website. In one embodiment, the Touch Point initiates the request by establishing an HTTP connection with the website. In other embodiments, other protocols for requesting and serving Internet content may be used.

At step 314, the website transmits the requested content back to the Touch Point. In one embodiment, the requested content is an HTML page. In other embodiments, the requested content may be any media format. Along with the content, the website transmits code that directs the Touch Point to request additional content from the sync partner. The code may be included in a widget or other web page element from the sync partner. In one embodiment, the code is an HTML tag for a single pixel image with a URL that points to the sync partner. For example:

```
<img src="https://www.syncpartner.com/pixel.gif" width="1" height="1">
```

Once the Touch Point receives the HTML with the embedded URL, in step 316, the Touch Point establishes an HTTP connection with the sync partner and requests the pixel image. Once a connection with the sync partner is established (at step 318), at step 320 the sync partner transmits a request that the Touch Point record a cookie. The following shows an example HTTP request by the sync partner to record a cookie:

```
Set-Cookie: sync_partner_id=23hd8sj2;
Domain=.synchpartner.com; Path=/; Expires=Wed, 13 Jan 2021
22:23:01 GMT; HttpOnly
```

In the example, the text string "23hd8sj2" is the value of the cookie, a sync partner ID and the cookie is set to expire on Jan. 13, 2021. The sync partner does not transmit the requested pixel image. Instead, the sync partner also sends a message redirecting the Touch Point to the OMS 211. The following shows an example message from the sync partner to the Touch Point that redirects the Touch Point:

```
HTTP/1.1 302 Found
Location:
https://www.OMS.com/pixel.gif?sync_partner_id=23hd8sj2
```

In the embodiment shown, the code also includes the sync partner ID as part of the redirection URL query string. This enables the OMS 211 to match the sync partner ID with the Public ID maintained by the OMS.

As shown in FIG. 7A, in various embodiments, the OMS maintains a table (or more than one table) matching Public IDs with sync partner identifiers. In particular embodiments, to deliver a marketing message to a consumer (e.g., particular consumer 103), the system may need a demand-side platform (DSP) identifier that is matched to the Public ID and sync partner ID for a given consumer. In one or more embodiments, to match a consumer's de-identified financial institution information to an opportunity to deliver the particular consumer a marketing message, the system matches the Public ID (as discussed herein, written to or received from a Touch Point), DSP ID (for recognizing a demand-side platform), and a Secure ID (for identifying various de-identified characteristics about the particular consumer, derived from the financial institution) for the particular consumer. The process of matching a Public ID with a DSP ID, and Secure ID with the Public ID for a particular consumer is further discussed below. As shown in exemplary FIGS. 7A, 7B, and 9, a Secure ID, Public ID, sync partner ID, and DSP ID are stored in the same table for a particular consumer. It should be understood from the discussions herein that, in particular embodiments, a Secure ID may be matched to a Public ID and the Public ID may be matched to a sync partner ID and/or DSP ID in a separate table to further protect the anonymity of consumers.

The sync partner may also transmit IDs from other third parties. In alternate embodiments, third party IDs are transmitted to the OMS 211 separately at a later time (step 340). For example, the sync partner may provide identifiers used by an ad exchange or a DSP for the Touch Point. As shown in FIG. 7B, the system, in various embodiments, is configured to match third party IDs and DSP IDs to the Public ID and sync partner ID for a particular consumer.

Returning to FIG. 3, at step 324, the Touch Point establishes a connection (e.g., HTTP or HTTPS connection) with the OMS 211 and requests the single pixel image. When the OMS receives this request, it then (step 328) transmits a request that the Touch Point record a cookie with a Public ID (as shown above, the Public ID, "38fhns66r", is encrypted in the cookie value):

```
Set-Cookie:
muZZVd5MOIJHYTf7jHcE+JhaU3OOQH7WQaq4Tk0bS/S4JMqZDQAuLO4ExhZGzHVn
TZGerIB56cWI2zc0kpkrlQ==;Domain=.OMS.com;Path=/; Expires=Wed, 13
Jan 2021 22:23:01 GMT; HttpOnly
```

In particular embodiments, the OMS 211 may use a particular process for creating the Public ID. In further embodiments, the cookie value and the Public ID may be the same value (e.g., the Public ID is the cookie value). This process is further discussed herein regarding FIG. 4.

In some embodiments, the OMS 211 may be configured to transmit the content to the Touch Point with the request that the Touch Point record the cookie. In these embodiments (and others), the process described in FIG. 3 terminates at step 330 and the sync partner does not receive the Public ID (but the OMS 211 receives the sync partner ID).

Returning to the embodiment shown in FIG. 3, the OMS 211 redirects the Touch Point back to the sync partner. The following shows an example message from the OMS 211 to the Touch Point that redirects the Touch Point:

```
HTTP/1.1 302 Found
Location:
https://www.syncpartner.com/pixel.gif?sync_partner_id=23hd8sj2&oms_public_id=38fhns66r
```

In the example embodiment, the redirection URL includes a query string with the Public ID (opposed to the cookie value). Once the Touch Point follows the above URL, at step 332, the sync partner will match the received Public ID and sync partner ID.

The TMS only syncs the Public ID with external partners, such as a sync partner. To protect privacy, the Secure ID is only used internally, or in secure communications with a financial institution, as discussed above.

In particular embodiments, the TMS may use fictitious identifiers when syncing with third-parties. This prevents third-parties from syncing identifiers among themselves. For example, the TMS assigns 752 as the Public ID for a Touch Point, sync partner 1 assigns the Touch Point an identifier of sp1-43, and sync partner 2 assigns the Touch Point an identifier of sp2-62. After syncing with the TMS, sync partner 1 matches sp1-43 with TMS identifier 752. Similarly, sync partner 2 matches sp2-62 with TMS identifier 752. If the sync partners share their data, they can match sp1-43 with sp2-62. This may put the privacy of the consumer at risk because the sync partners may learn more about the consumer's behavior than intended. In various embodiments, the TMS may avoid this by not exposing the Public ID to the sync partners, and instead using unique, fictitious identifiers in place of the Public ID for each sync partner. In these embodiments, the TMS internally matches the fictitious identifiers with the Public ID. For example, similar to the above example, the TMS assigns 752 as the Public ID for a Touch Point. Continuing with this example, the TMS assigns a public or fictitious unique identifier for each synch partner. Still continuing with this example, the TMS communicates with sync partner 1 using the fictitious Public ID=t194 and communicates with sync partner 2 using the fictitious Public ID=t866. Internally, in this example, the TMS associates both fictitious identifiers with the true Public ID=752.

Finally, at step 336, the Touch Point completes loading the content of the www.anysite.com website. At that point, the Touch Point stores two cookies: the sync partner ID and the cookie value that includes the Public ID. In embodiments where the OMS 211 has redirected the Touch Point back to the sync partners, both the sync partner and the OMS store a matched Public ID and sync partner ID.

It should also be understood that the process described above (still referring to FIG. 3) is on-going. The same user may interact with a single or multiple Touch Points any number of times within any given period. The OMS public identification service will continue to update, maintain, and add entries over time.

Touch Point Identifier

A Touch Point Identifier can be used as an alternative to the use of cookies and ID syncing, as described above. Because the Touch Point Identifier is not unique to the TMS, no syncing with third-parties is required.

In various embodiments, the OMS 211 is configured to read an identifier from the Touch Point without first writing a cookie. In these embodiments, the OMS may read any identifier associated with the Touch Point or the user. Certain identifiers may not be unique to a Touch Point or user, such as an IP address. For such identifiers, the OMS 211 may compute a probability that the identifier is associated with a particular user or Touch Point.

This embodiment is effective even when the consumer is not using an application that supports cookies. The Touch Point Identifier may be used as the Public ID or, alternatively, the OMS 211 creates a new Public ID and matches it with the Touch Point Identifier.

Part 2: Interaction with Financial Institution

As shown by FIG. 8, the process begins when a particular consumer 103 logs into his or her financial institution portal to view his or her account(s). In this example, at step 803, the particular consumer 103 connects to myfirstbank.com. At step 805, an injection process begins; in which any matched offers are merged into the respective financial institution portal for display in association with respective consumer transactions.

At step 807, the financial institution requests a matched offer from the OPS 207. Upon receiving the request for content, the OPS 207 determines what content to deliver at step 809 and delivers the content to the financial institution vehicle at step 811. The content is added, at step 813, to the myfirstbank.com webpage or application (e.g., with banking content) and may include a targeted marketing offer (TMO), a link to a TMO and/or one or more beacons. In various embodiments, a beacon is an instruction for the consumer's Touch Point to make a request to a beacon service which may be associated with the OMS 211. In one embodiment, the beacon may be a single pixel image HTML tag with a URL pointing to the OMS 211 beacon service. In various embodiments, the beacon functionality may be accomplished through other suitable means, including Javascript or via remote API calls by the financial institution vehicle. The request to the OMS 211 beacon service may, in various embodiments, contain a Secure ID, which is created by the financial institution for anonymous identification of the particular consumer 103 connected to the financial institution portal. In various embodiments, the Secure ID is included as part of the content for the beacon from the OPS 207, for example as part of a URL query string. At step 815, the content from the OPS 207 is then delivered to the particular consumer 103's Touch Point.

The beacon may also, in certain embodiments, include instructions to gather one or more parameters from the Touch Point that may be used to identify the Touch Point. Such parameters may include, but should not be limited to, an IP address, one or more HTTP cookies, a device ID, a component ID (e.g., a MAC address), an Android ID or Apple IDFA, a username, one or more HTTP headers, at least one object in the POST or PUT collection, and/or attached objects. It should be understood by one of ordinary skill in the art that a Secure ID may be obfuscated or encrypted (e.g., not transmitted in plain text).

In one embodiment, the beacon includes an HTML tag for a single pixel image. The URL for the HTML tag points to the OMS 211 and includes the Secure ID. For example:

```
<img src="https://www.OMS.com/pixel.gif?xt=BF8-F9ZC4N-BPHR-
F-G" width="1" height="1">
```

The example text string BF8-F9ZC4N-BPHR-F-G includes the obfuscated Secure ID. When the Touch Point requests the single pixel image from the OMS 211, the text string with the obfuscated Secure ID is included in that request. In various embodiments, the text string described above may include any suitable information, in addition to, or instead of, the Secure ID, such as, for example, a date, a time, and/or various instructions for formatting the beacon request or other information to be passed to the OMS 211.

In various embodiments, the Touch Point initiates the request for the single pixel image by establishing an HTTPS connection to the OMS 211, as shown by step 819. Once the HTTPS connection is established, the query string with the obfuscated Secure ID is transmitted to the OMS 211, as shown in step 821. In various embodiments, the Touch Point also transmits the cookie with the Public ID to the OMS 211, if the Touch Point has a stored cookie associated with the OMS 211 domain. In alternative embodiments where a Touch Point identifier is used instead of a cookie, the Touch Point transmits that identifier to the OMS 211 (which may be treated by the OMS 211 as the Public ID).

The OMS 211 then matches the Public ID with the Secure ID. To maintain privacy and confidentiality, any connections requesting or sending the Secure ID use a secure transfer protocol, such as Hypertext Transfer Protocol Secure (HTTPS).

In various embodiments, the OMS 211 beacon service examines each request to locate information that can match a Secure ID to a Public ID. In various embodiments, the OMS 211 beacon service is configured to determine whether the beacon request includes enough information to create a match between the Secure ID and the Public ID. In particular embodiments, OMS 211 beacon service determines whether there is enough information to create the match between the Secure ID the Public ID upon determining that the Public ID was included within the request to the beacon service from the Touch Point (e.g., cookie containing the Public ID or the Public ID as a Touch Point Identifier). In some embodiments, the OMS 211 beacon service is configured to determine whether the beacon request includes enough information to create a match between the Secure ID and the Public ID by examining other parameters associated with the Touch Point, such as one or more HTTP cookies, a device ID, a component ID (e.g., a MAC address), an Android ID or Apple IDFA, a username, one or more HTTP headers, at least one object in the POST or PUT collection, and/or attached objects.

If the OMS 211 determines that not enough information is available in the beacon request to create a match, then the system is configured to stop the process. Upon determining that there is enough information contained in the beacon request to create a match, the OMS 211 queries a match table for a corresponding record. If the system determines that a record does not exist for this match, then a new record is created. In various embodiments, the new record includes Public ID, the Secure ID, a date and time of record creation and other relevant data included in the beacon request. If, however, the system determines that the record of this match already exists, then an update is made to include the most recent date and time. The immediately preceding matching process may be completed in real-time or may be delayed. In embodiments where the matching processes is delayed, the beacon service may write potential matches to a particular file that is later retrieved and processed by a separate subsystem (opposed to the beacon service) to determine matches as described above.

FIG. 9 illustrates a match table used by the OMS 211 to store sets of matching identifiers: Secure ID, Public ID, Sync Partner ID, and DSP ID (demand side platform ID). As shown in FIG. 9, the first match corresponds with the example discussed above. The Secure ID (discussed in more detail below) is 6836295 and corresponds to a particular financial institution account or customer. In the next column is the matching Public ID, 38fhns66r. The Public ID corresponds to a particular Touch Point, and in various embodiments, the Public ID is a cookie value or encrypted within a cookie value stored on a consumer Touch Point. In the next column is a Sync Partner ID, 23hd8sj2, which is an identifier used by a sync partner for the same consumer Touch Point. In the next column is a DSP ID, 86374uf7, which is also an identifier for the same consumer touch, used by the DSP. The DSP ID may be provided by the sync partner or the DSP itself.

Since a single user may have interacted with multiple Touch Points and with multiple financial institution vehicles over time, the OMS 211 builds connections across various Public IDs. As a particular example, a single Secure ID may be matched to a first Public ID associated with a mobile web browser, a second Public ID associated with a home Macintosh desktop computer, a third Public ID associated with a workplace desktop computer, and a fourth Public ID associated with a laptop computer, all operated by the same user. Continuing with this example, each match record in this scenario represents a Touch Point back to the same user. A user, in this particular example, may have interacted with a Touch Point using their home Macintosh desktop computer as well as their work PC and their mobile phone. Continuing with this particular example, the user may have interacted with a financial institution vehicle using these same devices though not at the same time. The OMS 211 beacon service will, in this particular example, have multiple match records for the same Secure ID effectively matching these disparate devices to an individual user (via each Public ID for each desperate device). Thus, in this way, through the financial institution vehicle, the system can match a user's online actions across any device that interacts with a financial institution vehicle.

It should be understood that data is pulled from the public ID pool and compared against one or more match tables. It should also be understood that, in embodiments where partnerships are formed, partner identifiers are included in records in order to create a comprehensive directory of matches across partners.

Further, one of ordinary skill in the art will understand that this is an ongoing process. For example, the same user may interact with multiple financial institution vehicles any number of times within any given timeframe. Thus, in this example, the OMS 211 beacon service continually adds and updates records over time.

Part 3: Serving a Digital Message

As discussed above, once the system has matched a Public ID with a Secure ID (and potentially other IDs) for a particular consumer (see FIG. 9), the system can respond to message opportunities for the consumer (e.g., opportunities to the send the consumer one or more marketing messages based on the Public ID) with one or more marketing messages based on (de-identified) financial characteristics of the consumer (e.g., financial characteristics associated with the Secure ID).

As shown in FIG. 10, a TMM is part of a marketing campaign developed by an advertiser (e.g., advertiser 108). Marketing campaigns are designed to target particular consumers. In creating a campaign, the advertiser defines campaign specifics, such as the start and end date of the campaign, Segments of consumers that the campaign will target (based on physical location of consumer, spend amounts, etc.) as well as the creative message (text, images, audio, video, etc.). In particular embodiments, a Segment defines a particular group of consumers (e.g., particular consumer 103) that will receive offers based on the transactions completed or spend amount. Other examples of categories that may be used to specify the consumers that may receive a message include: the location of purchases, the spend at a particular retailer, the spend at a particular type of retailer (e.g., restaurants, gas stations, clothing stores, etc.) or the total spend. The de-identified transactional data is used to present the advertiser with an estimated number of consumers that satisfy the target campaign. An exemplary process of creating marketing campaigns is briefly discussed below and in detail in U.S. patent application Ser. No. 12/486,140, entitled "Offer Placement System and Methods for Targeted Marketing Offer Delivery System", filed on Jun. 17, 2009, now U.S. Pat. No. 8,595,065, which is incorporated herein by reference in its entirety and other related patents and patent applications.

In one embodiment, de-identified transaction data (i.e., transaction data void of any consumer- or account-specific identifying information) is sent to an OPS 207 by a respective financial institution 205. Generally, the transaction data is de-identified by each financial institution according to the institution's own internal protocols and procedure for removing account information and other consumer-identifying information. Each OPS 207 stores this information for subsequent offer matching. Additionally, each OPS 207 makes the de-identified consumer transaction information available to the OMS 211 for use in campaign creation. The OPS 207 may apply additional means to protect consumer privacy, for example by aggregating data. When needed, the OMS 211 requests and accesses the de-identified transaction data and utilizes it during campaign creation to estimate potential populations of consumers that will receive TMOs. During campaign creation, advertisers that wish to provide TMOs or TMMs interact with an OMS 211 advertiser portal that displays campaign specifics, enables creation of Targeted Marketing Segments and offers, allows advertisers to define dimensions and specific criteria associated with each Segment and offer, etc. As briefly discussed above, campaign management may also occur at a demand-side platform, opposed to at the OMS 211.

In the case of TMOs, once a campaign (and its associated offers) has been created, the OMS 211 transmits the campaign data to the OPS 207 for merging with transactional data and delivery to consumers. According to one embodiment, the OPS 207, via a predetermined matching algorithm, matches specific consumer financial transactions with offers that satisfy the Segment dimensions associated with the offers.

In addition to being remotely connected to the OMS 211, the OPS 207 is directly connected to a financial institution system 205 to enable direct and secure communication of information back and forth between the OPS 207 and financial institution, as the OPS 207 is protected behind a firewall, which may be the financial institution's existing firewall(s) (as shown in FIG. 1).

The financial institution 205 employs its own protocol for removing identifying information from consumer financial transactions. Such identifying information is removed to protect consumer privacy, maintain security, etc. Thus, the transactions data received by the OPS 207 includes a plurality of financial transactions indicating merchants involved in the transactions, merchant types, spend amounts, dates, payment mechanism types, and other similar information. However, the information does not include specific consumer names, account numbers, or other identifying information.

Importantly, even though it is stripped of consumer-identifying information, de-identified consumer transaction typically does not leave the OPS 207 (for purposes of regulatory compliance and consumer privacy). Thus, when the OMS 211 requires consumer transaction data for campaign generation, the OMS 211 makes a query into the OPS 207, and the OPS 207 returns an aggregated total of consumers and/or transactions associated with the particular request linked to a secure identifier (e.g., a Secure ID). For example, as an advertiser creates a particular Segment, the OMS 211 requests from the OPS 207 the total number of consumers or transactions that satisfy the Segment and the OPS 207 returns such an aggregated total (and, in one embodiment, the aggregated purchase histories of the consumers at a merchant or merchant group associated with the Segment). However, specific de-identified transactions typically do not leave the OPS 207. De-identified consumer transaction data is retained within the OPS 207 behind the financial institution's security components. The purpose of the structural distinction between the OPS 207 and OMS 211 as described herein is to ensure the privacy of consumer transaction data, and other structures may be used that serve that purpose.

Once the campaign has been created, it is loaded into the OMS, as shown in FIG. 10. If a particular consumer 103 within the targeted Segment visits a website (e.g., MyYooHoo.com), and identifiers for the particular consumer 103 (e.g., Public ID) match identifiers associated with the target campaign (e.g., Secure ID), then a message for the campaign may be displayed to the consumer.

In particular embodiments, when particular consumer 103 accesses a website http://MyYooHoo.com, the website includes advertising content. It should be understood by one of ordinary skill in the art that advertising content may be displayed in any suitable location and/or format in relation to other website content (e.g., news article, video, etc.). In one embodiment, advertising content is displayed below, alongside, and/or above the website content. In particular embodiments, advertising content is presented to the consumer before the website content is presented (e.g., a user views a message before the content is shown, before a video is played, etc.). In further embodiments, the advertising content is presented interstitially with website content or over a portion of website content (e.g., a banner ad appears cover a small portion of the website content, an ad is placed in the middle of a text article, etc.). In still further embodiments, advertising content is present as a pop-up type advertisement (e.g., which may, in some instances, be displayed in a separate window). It should be noted that although this example portrays a visual advertisement, the TMS 215 may transmit any suitable type of message to a consumer, such as an audio advertisement (e.g., via a mobile application, digital radio, satellite radio, etc.).

In the embodiment shown in FIG. 10, when the particular consumer 103 accesses the website http://MyYooHoo.com, a notification that the particular consumer 103 has accessed the website is sent to an advertising exchange (e.g., advertising exchange 118). The notification that the consumer has accessed the website may be transmitted to the advertising exchange in any suitable way, as will be recognized by one of ordinary skill in the art.

The notification that the particular consumer 103 has accessed the website may include any suitable information. In one or more embodiments, the notification includes an identifier for the consumer's Touch Point that is recognizable to the ad exchange, e.g., Ad Exchange Public ID. Just as the Public ID identifies the Touch Point for the TMS, the Ad Exchange Public ID may identify the Touch Point for the ad exchange 118. In particular embodiments, the notification includes available ad space on the website for which ad content is needed. In further embodiments, the notification includes other information such as the content of the media the particular consumer 103 is viewing (the subject matter of the news article, a summary of the content of a video, etc.), the location or placement of the advertising space on the web page, the size of the message, the web browser or application that the consumer is using, the URL that the consumer is visiting, a time the particular consumer 103 is accessing the content, a location of the consumer (e.g., country, region, city, a GPS location, etc.), the consumer's IP address, and/or any other suitable contextual or consumer-based information and/or attributes as further discussed herein.

The ad exchange may be any suitable company and/or mechanism to match publishers (such as publisher web server 155 shown in FIG. 1) and other entities that have advertising impression inventory (such as a supply-side platform) with advertisers or other entities that have an inventory of digital advertising (such as DSP 114). The ad exchange may facilitate buying and selling of online media advertising and advertising space (also known as impressions). In various embodiments, the ad exchange utilizes real time bidding to facilitate the buying and selling of advertising space (e.g., advertising space on the website accessed by particular consumer 103). In one or more embodiments, the ad exchange requests an advertisement to place in advertising space (e.g., on the website accessed by the particular consumer 103) from any number of bidders in real time, in response to notifications that an advertising space is available. In various embodiments, the ad exchange receives multiple bids from various bidders and determines (e.g., in some embodiments, the highest bidder) the ad to send to a publisher (e.g., to be seen by the particular consumer 103). Examples of suitable ad exchange services include (but are not limited to) DoubleClick and OpenX®.

In various embodiments, the ad exchange receives bids for messages from a DSP 114, or multiple demand-side platforms. The DSP 114 may in turn represent multiple advertisers, such as the TMS.

The following is an example of how the ad exchange and DSP 114 operate with the TMS 215. In this example, the publisher web server is MyYooHoo.com and a consumer accesses the home page (http://www.MyYooHoo.com/) via a Touch Point (as shown in FIG. 10). A banner advertisement space is available at the top of the page, which includes code instructing the Touch Point to request content (e.g., for an ad) from the ad exchange. The Touch Point then makes the request for content to the ad exchange, which may include a report on the consumer and any cookies stored by the browser, such as, for example, MyYooHoo ID=623. The ad exchange responds to the request for content virtually in real-time. In this context, real-time means that a message (here, a banner ad) must be delivered to the consumer at the time the web page is downloaded and displayed, or very soon after. The consumer will expect minimal delay for the complete web page to load, including all messages from marketers.

The ad exchange receives the report, including the identifier MyYooHoo ID=623. The ad exchange has synced identifiers, using the partner syncing method described above regarding FIG. 3. Thus, the ad exchange is able to match MyYooHoo ID=623 with the identifier Ad Exchange ID=917. The ad exchange then sends a report to DSP 114 requesting a bid for the advertising space. The report includes the Ad Exchange ID=917. The demand-side platform has synced identifiers, again using the partner syncing method described above regarding FIG. 3. The demand-side platform is able to match Ad Exchange ID=917 with DSP ID=534.

The demand-side platform responds to requests from the ad exchange by using campaign data from the TMS. Again, using the syncing method described above, the TMS has DSP IDs matched with Public IDs (e.g., see FIG. 9). In various embodiments, an advertiser includes a DSP ID with campaign data.

In certain embodiments, there is no DSP 114 and the TMS is presented with real-time messaging opportunities directly from the ad exchange. In these embodiments, the TMS uses a Public ID as the DSP ID and responds directly to the ad exchange. In other embodiments, there is no DSP 114 or ad exchange, and the TMS is presented with real-time messaging opportunities directly from the publisher web server. In these embodiments, the TMS uses a Public ID as the Ad Exchange ID and responds directly to the Publisher Web Server or may deliver content directly to the Touch Point.

In various embodiments where the system is presented with real-time messaging opportunities, there may be multiple targeted campaigns that include the particular consumer 103. In these embodiments, the system (or the demand-side platform) evaluates all eligible advertising campaigns and selects the message that has been scored highest for that particular consumer 103, according to the pre-targeting methods discussed below. The message score is a product of pretargeting data, campaign data Segment data, and other data. In particular embodiments, the system may be configured to adjust a message score up or down by data points including, for example, an indication that the particular consumer 103 has interacted with similar messages in the past, an indication the particular consumer 103 has made a recent relevant purchase, an indication the particular consumer 103 has not made a purchase at a specific retail location, an indication the particular consumer 103 is currently in a location within a proximity to a retail location, an indication the campaign is nearing an end date, an indication the campaign is utilizing a predetermined budget too quickly, an indication the message is not meeting an engagement threshold, an indication the particular consumer 103 has not been delivered this message yet, an indication the message tends to perform well at this web site or on this device, etc.

In at least one embodiment, the system is configured to adjust the minimum bid (e.g., the minimum bid that is part of the campaign and message data) based on the message score. In one or more embodiments, the system is configured to attach the bid information to the message in the form of a bid response. In particular embodiments, the system is configured to deliver the message (either with or without bid response) to the Touch Point (e.g., the message is sent to be displayed to a consumer).

In other embodiments, the ad exchange bidding process is not real time. In these embodiments, the ad exchange identifies messages suited for advertising space that will be available in the future. According to particular embodiments, once the ad exchange determines a winning bid, the ad exchange sends the winning message or URL to the publisher (e.g. to web publisher 155) for publishing on the publisher's website (e.g., myyoohoo.com in FIGS. 1 and 10). The publisher publishes the URL (e.g., the winning message) to the website, which is viewed by the particular consumer 103. It will be understood by one of ordinary skill in the art that the above described process typically happens on a millisecond time-frame, such that there is little or no delay apparent to the consumer.

Exemplary Pre-Targeting Process

Turning to FIG. 11, a pre-targeting process, in various embodiments, may be part of the creation and management of targeted marketing campaigns that are created by an advertiser 108 or by system operators (an agent of the advertiser). A targeted marketing campaign may include many attributes (or few attributes), some of which may include, for example, campaign ID, advertiser name, advertiser account, IO (insertion order) number, contract number, start and end dates, budget(s), advertisement assets (e.g., banners, logos, message text, video, etc.), advertisement specifications, site lists, flight dates, strategy, billing type, campaign type, target audience(s), performance data, client category, etc. According to particular embodiments, the parameters of a targeted marketing campaign are used to define one or more Targeted Marketing Segments, which are used to define audiences for a particular TMM or a number of TMMs. It should be understood that a campaign may have any number of audiences and audiences may be presented with any number of different TMMs during the course of a campaign. It should also be understood that, in at least one embodiment, the campaign creation process defines a pre-targeted audience and is performed before a campaign is launched, but may be continually updated as a campaign runs. As discussed herein, targeted audiences may be at least partially defined by financial profile data (e.g., financial transaction data from a financial institution associated with a particular consumer). Campaign creation is further discussed in detail in the various patent applications incorporated by reference herein.

At a step 1101, an advertiser 108 defines a target qualifier. In various embodiments, the target qualifier indicates that a financial profile is (or should be) within the audience. Target qualifiers may be, for example, where a consumer associated with a profile lives (e.g., a zip code, city, state, or country), a number of transactions a profile includes within a date range, whether a consumer associated with a profile has spent a minimum or maximum threshold amount at a certain retail location or category of retailer, a consumer associated with a profile has not transacted with a retail location or category for a defined period, a consumer associated with a profile is available to receive messages on a particular device or browser type, a consumer associated with a profile is available to receive a TMM in a certain way, a consumer associated with a profile has made a transaction in a certain way (e.g., online, offline, in store, etc.), any other relevant actions by a consumer (e.g., had messages delivered previously, interacted with messages, visited a particular website, used a particular application), etc.

In various embodiments, the advertiser 108 may be required to set at least one additional value for the target qualifier. In a particular example, the advertiser 108 may be required to select a transaction amount and or a retailer name. According to one embodiment, upon determining that the target qualifier is set, at step 1103, the system queries various financial profiles to determine whether one or more financial profiles meet the selected target qualifier (e.g., whether one or more financial profiles include the selected qualifiers).

At step 1105, the system is configured to determine whether the returned number of financial profiles is below a certain privacy threshold. According to one or more embodiments, if the returned number of financial profiles is below the certain privacy threshold, then the advertiser 108 receives an error message at step 1107. It should be understood that the privacy threshold may prevent the advertiser 108 from creating Segments (e.g., pre-targeted audience) small enough that profile identities may be discernable.

Upon determining that one or more financial profiles meet the selected target qualifier and that the target audience meets the minimum privacy threshold, the system is configured to return the number of financial profiles available that meet the qualifications at step 1109. The system, at step 1111, determines whether the target qualifier is the last qualifier. The advertiser 108 may layer qualifications (e.g., qualifiers) in a number of ways. In various embodiments, layering is done by an approximation of Boolean logic in that qualifiers are added as ANDs ORs and NOTs. An example of this layering might be that a financial profile lives in New York AND has a quick-service restaurant (QSR) transaction over $15.00 OR has a convenience store transaction over $30.00 AND has NOT had any messages delivered to them in the last 60 days.

According to particular embodiments, the system may enable the advertiser 108 to iterate over the creation and modification of targeted profiles/Segments any number of times. In at least one embodiment, with each additional qualifier added by the advertiser 108, the number of profiles in the pre-targeted audience may shrink.

Segments (e.g., pre-targeted audiences) of profiles may, in various embodiments, be saved and re-used in a number of different ways. In a particular example, a Segment might represent "heavy technology buyers in the southeast US," such that this Segment of targeted profiles may be used for transmitting targeted messages from a number of different advertisers or for multiple campaigns for the same advertiser over time.

The system may enable a user to combine one or more defined Segments (e.g., one or more pre-targeted audiences). According to particular embodiments, Segments may be layered with or against each other in a Boolean fashion. In at least one embodiment, an advertiser 108, for example, may add multiple Segments to create a larger Segment, remove (subtract) a Segment from another Segment reducing its number, and/or multiple Segments can be used to create a cross-section where the multiple Segments intersect, thus reducing the size of the resulting Segment. In a particular example, an advertiser 108 may combine a defined "Heavy Technology Buyers" Segment and a "Frequent QSR purchasers" Segment to produce, in this example, the following effective Segments: 1) Heavy Technology Buyers and Frequent QSR Purchasers; 2) Heavy Technology Buyers who are not Frequent QSR Purchasers; 3) Heavy Technology Buyers who are also Frequent QSR Purchasers; and/or 4) Frequent QSR Purchasers who are not Heavy Technology Buyers.

In various embodiments, the advertiser 108 may also want to layer in third party Segments (e.g., third party Segments such as, "In Market TV buyers" and/or "Moms 25-35") from third party data sources 136 such as, for example, BlueKai, IXI, and Lotame. In particular embodiments, the advertiser 108 may want to add its own data collected about various consumers. In embodiments where the advertiser 108 adds third party data or its own data (and other embodiments), the system matches a third party ID (or advertiser ID) with a Public ID. It should be understood that third party Segments may be used to limit the pre-targeted audience or expand it past the set of financial profiles. It should also be understood from this disclosure that financial profile information does not need to be shared in order for matches to be made.

In one or more embodiments, in order to expand a small pre-targeted audience, the advertiser 108 may choose to use a number of models that will allow for joining of unmatched Public IDs to an audience of matched Secure IDs (e.g., financial IDs) in order to gain insight based on third party Segments. In particular embodiments, such insights may include insights not available through the financial profile, such as a consumer's participation in certain groups, recorded interest in a yet to be purchased item, visitation to certain websites or use of different applications.

According to particular embodiments, the system may be configured to use mathematical models of consumer data to create new and/or different Segments. In various embodiments, exploration of how activities of consumers correlate to one another may allow for the creation of modeling algorithms partially based on financial profiles. In further embodiments, models and algorithms allow for the extension of targeting and creation of Segments that include Public IDs where no financial profile has been matched. It should be understood that modeling may increase reach of messages.

Returning to FIG. 11, upon determining that the target qualifier is the last qualifier, the system is configured to associate the returned audience with the campaign parameters (e.g., associated Secure IDs of the returned audience with the campaign parameters at step 1113. Based upon associating the Secure IDs with the campaign parameters, the system is configured to, at step 1115, gather Public IDs from financial profiles. In other words, the system is configured to match campaigns associated with Secure IDs to their corresponding Public IDs (which are matched as discussed above).

The system may be configured to save pre-targeted audiences defined by the advertiser 108. In at least one embodiment, saving a pre-targeted audience definition includes the qualifier definitions. It should be understood that, in particular embodiments, as profile information is updated, searching for these qualifiers may reach a different audience size from day to day (e.g., as information about consumers changes, attributes may be included/changed as profiles are (constantly) updated). It should be understood that pre-targeted audiences are associated to campaigns, though a single audience could be used by multiple campaigns or for multiple advertisers depending on each system user's strategies and goals.

At step 117, the system is configured to adjust message score/priority for each TMM associated with a Public ID. According to particular embodiments, the system is configured to assign a score/priority to profiles (defined by a Public ID or Secure ID) that are within a pre-targeted audience for a particular marketing opportunity. In at least one embodiment, the message decision process may use the score/priority to determine in real-time which message should be delivered. The score/priority may be based on any number of suitable factors, such as, for example, category of message, past history of the profile's engagement with messages, a profile's strength within the audience (e.g., frontrunner or outlier), defined campaign strategy of an advertiser 108 and/or otherwise associated with the system, etc.

It should be understood that, in particular embodiments, message priority is a factor that the system may change on an ongoing basis. For example, message priority may change as campaigns run, as profiles are updated based on OPS data, and/or based on post message analysis data. It should also be understood that the Public IDs and messages with scores/priority are made available to the message decision process. At step 1119, the system is configured to record target audience and campaign information for message decision processing (e.g., for transmitting TMMs to consumers associated with particular Public IDs based on the process above).

CONCLUSION

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A computer system for matching private and public identifiers, the system comprising:
    a first portion of a distributed architecture communicatively coupled to a financial institution and located behind a firewall, the first portion comprising at least one first computing device that is configured to:
        transmit content to a particular consumer's computing device via a secure online portal associated with the financial institution, wherein the content includes a call to a beacon service and a secure identifier, wherein the secure identifier is an anonymous identifier associated with the particular consumer in the financial institution;
    the particular consumer's computing device configured to execute the call to the beacon service to make a request comprising the secure identifier and a public identifier corresponding to the particular consumer's computing device to the beacon service;
    the beacon service comprising at least one second computing device, the at least one second computing device being configured to:
        examine the request from the call to locate particular information; and
        determine that the particular information comprises the secure identifier and the public identifier; and
        write the secure identifier and the public identifier as a potential match for processing; and
    a second portion of the distributed architecture located outside of the firewall communicatively coupled to the first portion of the distributed architecture wherein the second portion comprises at least one third computing device that is configured to:
        receive the public identifier and the secure identifier associated with the particular consumer via the call to the beacon service from the particular consumer's computing device;

match the public identifier with the secure identifier associated with the particular consumer based on the potential match;

store the matched public and secure identifier associated with the particular consumer in a match table;

create at least one segment associated with one or more categories comprising secure identifiers, wherein at least one category is based on data from the financial institution;

associate the at least one segment with the public identifier associated with the particular consumer based on the match table; and based on the association of the at least one segment to the public identifier, facilitate delivery of a particular message to the particular consumer's computing device.

2. The computer system of claim 1, wherein the at least one third computing device is further configured to receive an indication that the particular message was delivered to the particular consumer's computing device.

3. The computing system of claim 1, wherein the third computing device is configured to receive campaign information from an advertiser for defining the at least one segment.

4. The computing system of claim 3, wherein the at least one first computing device is further configured to transmit the call to the beacon service by transmitting code to request a pixel or image.

5. The computing system of claim 1, wherein the at least one third computing device is further configured to receive, from a demand-side platform, a demand-side platform identifier for the particular consumer.

6. The computing system of claim 1, wherein the at least one third computing device is further configured to receive a sync partner identifier for the particular consumer, wherein the sync partner identifier is matched to the public identifier.

7. The computer system of claim 6, wherein the at least one third computing device is further configured to receive a demand-side platform identifier with the public identifier.

8. The computing system of claim 7, wherein the at least one third computing device is further configured to match the demand-side platform identifier with the secure identifier associated with the particular consumer by the match table.

9. The computer system of claim 8, wherein the match table comprises the public identifier, the secure identifier, and the demand-side platform identifier associated with the particular consumer.

10. The computer system of claim 9, wherein the at least one third computing device is further configured to facilitate delivery of the particular message to the particular consumer's computing device by transmitting the at least one segment matched to the demand-side platform identifier and the particular message to a demand-side platform for transmitting the particular message to the particular consumer's computing device.

11. The computer system of claim 9, wherein the match table comprises the public identifier, the secure identifier, the demand-side platform identifier, and one or more partner identifiers associated with the particular consumer, wherein each of the one or more partner identifiers is for identifying the particular consumer to each of one or more partners.

12. The computer system of claim 1, wherein the at least one third computing device is further configured to facilitate delivery of the particular message to the particular consumer's computing device by transmitting the particular message to an advertising exchange to be delivered to the particular consumer's computing device.

13. The computer system of claim 1, wherein the at least one third computing device is further configured to facilitate delivery of the particular message to the particular consumer's computing device by transmitting the particular message to a publisher for publishing the particular message for viewing by the particular consumer.

14. The computer system of claim 1, wherein the at least one third computing device is further configured to:

write the public identifier to be associated with the particular consumer's computing device; and transmit the public identifier to the particular consumer's computing device.

15. The computer system of claim 1, wherein: the particular consumer's computing device is a mobile device.

16. The computer system of claim 1, wherein the at least one third computing device is further configured to:

create one or more segments, wherein each segment of the one or more segments includes a category of secure identifiers associated with one or more parameters derived from non-public data;

receive an advertising exchange identifier for identifying the particular consumer, wherein the advertising exchange identifier is associated with the public identifier;

store the advertising exchange identifier in the match table;

match at least one segment of the one or more segments to the advertising exchange identifier based on the match table indicating an advertising identifier is matched to the public identifier or the secure identifier; and transfer the at least one segment to an advertising exchange for delivering a targeted marketing message to the particular consumer.

17. A computer-implemented method for matching private and public identifiers, the method comprising the steps of:

providing at least one second computing device corresponding to a second portion of a distributed architecture located outside of a firewall communicatively coupled to at least one first computing device of a first portion of the distributed architecture;

transmitting, by the first portion of the distributed architecture, content to a particular consumer's computing device via a secure online portal associated with a financial institution, wherein the content includes a call to a beacon service comprising a secure identifier, the secure identifier is an anonymous identifier for the particular consumer in the financial institution, and wherein the first portion of the distributed architecture is communicatively coupled to the financial institution and located behind the firewall;

making, via the call to the beacon service included with the content being executed by the particular consumer's computing device, a request comprising the secure identifier and a public identifier corresponding to the particular consumer's computing device to the beacon service;

examining, via the beacon service executed by at least one third computing device, the request from the call to locate particular information; and determining, via the beacon service executed by the at least one third computing device, that the particular information comprises secure identifier and the public identifier; and writing, via the beacon service executed by the at least one third computing device, the secure identifier and the public identifier as a potential match for processing;

receiving, at the second portion of the distributed architecture, the public identifier and the secure identifier associated with the particular consumer via the call to the beacon service from the particular consumer's computing device;

matching the public identifier with the secure identifier associated with the particular consumer based on the potential match;

storing the matched public and secure identifier associated with the particular consumer in a match table;

creating at least one segment associated with one or more categories comprising secure identifiers, wherein at least one category is based on data from the financial institution;

associating the at least one segment with the public identifier associated with the particular consumer based on the match table; and based on associating the at least one segment to the public identifier, facilitating delivery of a particular message to the particular consumer's computing device.

18. The computer-implemented method of claim 17, wherein the method further comprises the step of receiving an indication that the particular message was delivered to the particular consumer's computing device at the second portion of the distributed architecture.

19. The computer-implemented method of claim 17, wherein the method further comprises the step receiving campaign information from an advertiser for defining the at least one segment at the second portion of the distributed architecture.

20. The computer-implemented method of claim 19, wherein transmitting the call to the beacon service comprises transmitting code to request a pixel or image.

21. The computer-implemented method of claim 17, wherein the method further comprises the step of receiving, from a demand-side platform, a demand-side platform identifier for the particular consumer at the second portion of the distributed architecture.

22. The computer-implemented method of claim 17, wherein the method further comprises the step of receiving a sync partner identifier for the particular consumer at the second portion of the distributed architecture, wherein the sync partner identifier is matched to the public identifier.

23. The computer-implemented method of claim 22, wherein the method further comprises the step of receiving a demand-side platform identifier with the public identifier at the second portion of the distributed architecture.

24. The computer-implemented method of claim 23, wherein the method further comprises the step of matching the demand-side platform identifier with the secure identifier associated with the particular consumer by the match table at the second portion of the distributed architecture.

25. The computer-implemented method of claim 24, wherein the match table comprises the public identifier, the secure identifier, and the demand-side platform identifier associated with the particular consumer.

26. The computer-implemented method of claim 25, wherein facilitating delivery of the particular message to the particular consumer's computing device comprises transmitting the at least one segment matched to the demand-side platform identifier and the particular message to a demand-side platform for transmitting the particular message to the particular consumer's computing device.

27. The computer-implemented method of claim 25, wherein the match table comprises the public identifier, the secure identifier, the demand-side platform identifier, and one or more partner identifiers associated with the particular consumer, wherein each of the one or more partner identifiers is for identifying the particular consumer to each of one or more partners.

28. The computer-implemented method of claim 17, wherein facilitating delivery of the particular message to the particular consumer's computing device comprises transmitting the particular message to an advertising exchange to be delivered to the particular consumer's computing device.

29. The computer-implemented method of claim 17, wherein facilitating delivery of the particular message to the particular consumer's computing device comprises transmitting the particular message to a publisher for publishing the particular message for viewing by the particular consumer.

30. The computer-implemented method of claim 17, wherein the method further comprises the steps of, at the second portion of the distributed architecture:

writing the public identifier to be associated with the particular consumer's computing device; and transmitting the public identifier to the particular consumer's computing device.

31. The computer-implemented method of claim 17, wherein: the particular consumer's computing device is a mobile device.

32. The computer-implemented method of claim 17, wherein the method further comprises the steps of:

creating one or more segments, wherein each segment of the one or more segments includes a category of secure identifiers associated with one or more parameters derived from non-public data;

receiving an advertising exchange identifier for identifying the particular consumer, wherein the advertising exchange identifier is associated with the public identifier;

storing the advertising exchange identifier in the match table;

matching at least one segment of the one or more segments to the advertising exchange identifier based on the match table indicating an advertising identifier is matched to the public identifier or the secure identifier; and transferring the at least one segment to an advertising exchange for delivering a targeted marketing message to the particular consumer.

33. The computer system of claim 1, wherein the public identifier is contained in a cookie.

34. The computer system of claim 33, wherein: a) the public identifier comprises an encrypted public ID and a last refresh date; and b) the last refresh date is the date the public identifier was set.

35. The computer system of claim 1, wherein the public identifier is an advertising identifier associated with a mobile device.

36. The computer system of claim 1, wherein the public identifier is one of a plurality of public identifiers matched with the secure identifier in the match table.

37. The computer-implemented method of claim 17, wherein the public identifier is contained in a cookie.

38. The computer-implemented method of claim 37, wherein the method further comprise the step of decrypting, by at least one third computing device, the public identifier.

39. The computer-implemented method of claim 38, wherein: a) the public identifier comprises an encrypted public ID and a last refresh date; and b) the last refresh date is the date the public identifier was set.

40. The computer-implemented method of claim 17, wherein the public identifier comprises an advertising identifier associated with a mobile device.

41. The computer-implemented method of claim 17, wherein the public identifier is one of a plurality of public identifiers matched with the secure identifier in the match table.

42. The computer-implemented method of claim 17, wherein the beacon service is associated with the second portion of the distributed architecture.

* * * * *